United States Patent
Morimoto et al.

(10) Patent No.: US 11,743,406 B2
(45) Date of Patent: Aug. 29, 2023

(54) ILLUMINATION DEVICE FOR IMAGE SENSOR

(71) Applicant: Glory Ltd., Himeji (JP)

(72) Inventors: Takaaki Morimoto, Himeji (JP); Akira Bogaki, Himeji (JP); Naoki Tomigaki, Himeji (JP); Yuki Kiyose, Himeji (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 17/898,524

(22) Filed: Aug. 30, 2022

(65) Prior Publication Data

US 2022/0417381 A1 Dec. 29, 2022

Related U.S. Application Data

(63) Continuation of application No. PCT/JP2021/007025, filed on Feb. 25, 2021.

(30) Foreign Application Priority Data

Mar. 2, 2020 (JP) ................................. 2020-035229

(51) Int. Cl.
 *H04N 1/028* (2006.01)
 *F21V 8/00* (2006.01)

(52) U.S. Cl.
 CPC ....... *H04N 1/02835* (2013.01); *G02B 6/0068* (2013.01); *G02B 6/0076* (2013.01); *H04N 1/02805* (2013.01); *H04N 1/02885* (2013.01)

(58) Field of Classification Search
 CPC . H04N 1/02835; G02B 6/0068; G02B 6/0076
 See application file for complete search history.

(56) References Cited

U.S. PATENT DOCUMENTS

| 6,172,356 B1* | 1/2001 | Ogura ............... H04N 1/0318 |
| | | 385/47 |
| 2009/0015886 A1* | 1/2009 | Kim ............... H04N 1/02885 |
| | | 358/484 |

(Continued)

FOREIGN PATENT DOCUMENTS

| JP | 2008-270885 A | 11/2008 |
| JP | 4720831 B2 | 7/2011 |

(Continued)

OTHER PUBLICATIONS

International Search Report and Written Opinion dated May 25, 2021, received for PCT Application PCT/JP2021/007025, Filed on Feb. 25, 2021, 8 pages including English Translation.

*Primary Examiner* — Mary Ellen Bowman
(74) *Attorney, Agent, or Firm* — Xsensus LLP

(57) ABSTRACT

Provided is an image sensor lighting unit including at least one light guide extending in a main scanning direction; a first light source group facing a first end surface of at least two end surfaces of the at least one light guide in the main scanning direction; and a second light source group facing a second end surface of the at least two end surfaces. The first light source group includes a first light source that emits light having a predetermined wavelength band. The second light source group includes a second light source that emits light having the wavelength band. An X-coordinate of the first light source in a corresponding XY-coordinate system is equal in absolute value to an X-coordinate of the second light source in a corresponding XY-coordinate system, with the at least one light guide viewed from the first end surface side in the main scanning direction.

10 Claims, 8 Drawing Sheets

(56) References Cited

U.S. PATENT DOCUMENTS

| | | | |
|---|---|---|---|
| 2009/0034285 A1* | 2/2009 | Lee | H04N 1/0282 362/555 |
| 2013/0265617 A1 | 10/2013 | Murakami et al. | |
| 2015/0015924 A1* | 1/2015 | Fujiuchi | H04N 1/02815 362/580 |
| 2015/0156372 A1* | 6/2015 | Aramaki | H04N 1/02895 358/447 |
| 2015/0249104 A1* | 9/2015 | Ota | G07D 7/12 250/208.1 |

FOREIGN PATENT DOCUMENTS

| | | |
|---|---|---|
| JP | 2011-223389 A | 11/2011 |
| JP | 5529318 B2 | 6/2014 |
| JP | 2015-154120 A | 8/2015 |
| JP | 6075216 B2 | 2/2017 |

* cited by examiner

Scanning direction (mm)

ILLUMINATION DEVICE FOR IMAGE SENSOR

CROSS-REFERENCE TO RELATED APPLICATIONS

The present application is a Continuation Application of PCT Application No. PCT/JP2021/007025 filed on Feb. 25, 2021, which claims priority to Japanese Patent Application No. 2020-035229 filed on Mar. 2, 2020, under the Paris Convention and provisions of national law in a designated State. The entire contents of each application are hereby incorporated by reference.

TECHNICAL FIELD

The present disclosure relates to image sensor lighting units and image sensors. The present disclosure more specifically relates to an image sensor lighting unit which can be used for an image sensor that acquires optical image information on a sheet, and an image sensor.

BACKGROUND

Some image sensor lighting units adopt a rod-shaped light guide to use point light sources as a line light source. The longitudinal end surfaces of the light guide each are provided with an incidence surface that the lights from the point light sources enter. The side surface of the light guide is provided with a band-shaped emission surface from which light is emitted toward the irradiation target.

Techniques related to image sensor lighting units including a light guide have been known. For example, JP 5529318 B discloses a technique of reducing the protrusion lengths of light sources whose light-emitting portion deviated and arranged closer to one side in the width direction relative to the center position of the light emitting surface when the light sources are set on both end surfaces of a light guide.

JP 4720831 B discloses a technique of producing a high-luminance image sensor lighting unit in which uniform light is applied to the ends of a light guide by adopting a structure in which holders each with a hole therein are provided at both ends of the light guide, one end of the light guide is inserted into part of the hole on one end, and a large number of LED chips are arranged on a substrate along the outer edge of the hole on the other end, the substrate including the mounting pads and connection pads for the respective LED chips.

JP 6075216 B discloses a lighting unit including a light source, a light guide that diffusely reflects light by its light diffusion area to emit the light to the outside, and a diffuse reflection body that diffusely reflects light transmitted through the light diffusion area to cause the light to enter the light guide again, wherein the light source includes visible light sources and ultraviolet light sources, the diffuse reflection body is made of a material of which the ultraviolet reflectance is lower than the visible reflectance, and at least one of the visible light sources is placed closer to the light diffusion area than the ultraviolet light sources are. This lighting unit is described to be able to achieve a uniform illuminance distribution in a longitudinally wide region without deteriorating the moldability of a component.

SUMMARY

One aspect of the present disclosure is directed to an image sensor lighting unit including: at least one light guide extending in a main scanning direction and configured to emit light in a predetermined direction; a first light source group facing a first end surface of at least two end surfaces of the at least one light guide in the main scanning direction; and a second light source group facing a second end surface of the at least two end surfaces, the first light source group including a first light source configured to emit light having a predetermined wavelength band, the second light source group including a second light source configured to emit light having a same wavelength band as the light emitted from the first light source, with an XY-coordinate system consisting of a Y-axis and an X-axis set with the at least one light guide viewed from the first end surface side in the main scanning direction, an X-coordinate of the first light source in a corresponding XY-coordinate system being equal in absolute value to an X-coordinate of the second light source in a corresponding XY-coordinate system, the Y-axis set on an optical axis of emitted light and being positive in a traveling direction of the emitted light, the X-axis formed by rotating the Y-axis clockwise by 90° with a center of an end surface of the corresponding light guide in the main scanning direction taken as an axis of rotation.

DESCRIPTION OF EMBODIMENTS

Figure 1:
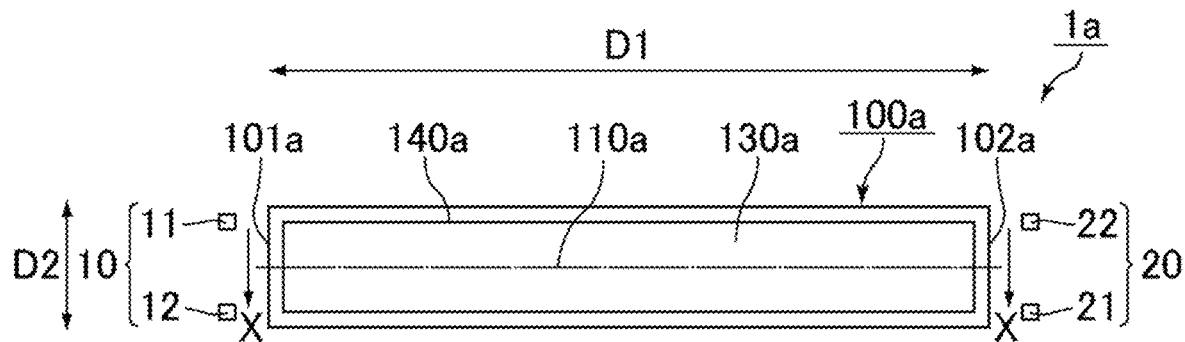
FIG. 1 is a schematic plan view of an image sensor lighting unit of Embodiment 1 as viewed from an emission surface side of a light guide.

In image sensor lighting units including a light guide, the uniformity of light from the emission surface of the light guide (hereinafter, such light is also referred to simply as "emission light") depends on diffusion patterns such as the cross-sectional shapes of the light guide, the diffusion surface pattern, and the arrangement of light sources, e.g., light emitting diodes (LEDs). Conventional image sensor lighting units have a light diffusion pattern that allows irradiation of the irradiation target with emission light uniform in the longitudinal direction (main scanning direction) of the light guide when LEDs are positioned in the center of an end surface of the light guide.

However, when LEDs emitting lights with different wavelength bands are arranged on an end surface of a light guide, not all the LEDs may be positioned in the center of the end surface of the light guide. This means that light having a certain wavelength band from an LED positioned off the center of the end surface of the light guide may not be emitted as emission light uniform in the longitudinal direction of the light guide. Thus, an image sensor lighting unit has been demanded which can emit light uniformly in the longitudinal direction of a light guide even when the light has a certain wavelength band from the light source positioned off the center of an end surface of the light guide.

JP 5529318 B, JP 4720831 B, and JP 6075216 B nowhere mention an arrangement of LEDs which optimizes the uniformity of light having a certain wavelength band from a light source positioned off the center of an end surface of a light guide.

In response to the above current state of the art, an object of the present disclosure is to provide an image sensor lighting unit that can increase the uniformity, in the main scanning direction, of light emitted from a light guide when a light source is positioned off the center of an end surface of the light guide; and an image sensor.

(1) In order to solve the above issue and to achieve the object, one aspect of the present disclosure is directed to an image sensor lighting unit including: at least one light guide extending in a main scanning direction and configured to emit light in a predetermined direction; a first light source group facing a first end surface of at least two end surfaces of the at least one light guide in the main scanning direction; and a second light source group facing a second end surface of the at least two end surfaces, the first light source group including a first light source configured to emit light having a predetermined wavelength band, the second light source group including a second light source configured to emit light having a same wavelength band as the light emitted from the first light source, with an XY-coordinate system consisting of a Y-axis and an X-axis set with the at least one light guide viewed from the first end surface side in the main scanning direction, an X-coordinate of the first light source in a corresponding XY-coordinate system being equal in absolute value to an X-coordinate of the second light source in a corresponding XY-coordinate system, the Y-axis set on an optical axis of emitted light and being positive in a traveling direction of the emitted light, the X-axis formed by rotating the Y-axis clockwise by 90° with a center of an end surface of the corresponding light guide in the main scanning direction taken as an axis of rotation.

(2) In the image sensor lighting unit of (1) above, the at least one light guide may include two or more light guides.

(3) In the image sensor lighting unit of (2) above, the first end surface and the second end surface may be respectively positioned at one end and the other end of a first light guide of the two or more light guides in the main scanning direction, and the X-coordinate of the first light source in the corresponding XY-coordinate system may be different in sign from the X-coordinate of the second light source in the corresponding XY-coordinate system.

(4) In the image sensor lighting unit of (3) above, the lighting unit may further include a third light source group facing a third end surface of a second light guide of the two or more light guides, the third end surface being one of two end surfaces of the second light guide in the main scanning direction, whichever closer to the first end surface of the first light guide, the third light source group may include a third light source configured to emit light having a same wavelength band as the light from the first light source, and an X-coordinate of the third light source in a corresponding XY-coordinate system may be equal to the X-coordinate of the first light source in the corresponding XY-coordinate system.

(5) In the image sensor lighting unit of (4) above, a Y-coordinate of the first light source in the corresponding XY-coordinate system may be different in sign from a Y-coordinate of the third light source in the corresponding XY-coordinate system.

(6) In the image sensor lighting unit of (4) or (5) above, a Y-coordinate of the first light source in the corresponding XY-coordinate system may be equal in absolute value to a Y-coordinate of the third light source in the corresponding XY-coordinate system.

(7) In the image sensor lighting unit of any one of (4) to (6) above, the first light source group may further include a fourth light source configured to emit light having a predetermined wavelength band, the third light source group may further include a fifth light source configured to emit light having a same wavelength band as the light from the fourth light source, and an X-coordinate and a Y-coordinate of the fourth light source in a corresponding XY-coordinate system may be respectively equal to an X-coordinate and a Y-coordinate of the fifth light source in a corresponding XY-coordinate system.

(8) In the image sensor lighting unit of (4) above, a Y-coordinate of the first light source in the corresponding XY-coordinate system may be equal to a Y-coordinate of the third light source in the corresponding XY-coordinate system.

(9) In the image sensor lighting unit of any one of (4) to (8) above, the lighting unit may further include: a fourth light source group facing a fourth end surface of the second light guide, the fourth end surface being one of two end surfaces of the second light guide in the main scanning direction, whichever farther from the first end surface of the first light guide; a first substrate on which the first light source group and the third light source group may be mounted; and a second substrate on which the second light source group and the fourth light source group may be mounted.

(10) In the image sensor lighting unit of any one of (2) to (9) above, an optical axis of light emitted from a first light guide of the two or more light guides may intersect an optical axis of light emitted from a second light guide of the two or more light guides.

(11) An image sensor of the present disclosure includes the image sensor lighting unit of any one of (1) to (10) above.

The image sensor lighting unit and the image sensor of the present disclosure can increase the uniformity, in the main scanning direction, of light emitted from a light guide when a light source is positioned off the center of an end surface of the light guide.

Hereinafter, embodiments of the image sensor lighting unit of the present disclosure are described with reference to the drawings. The image sensor lighting unit of the present disclosure can be used in various fields and is applicable to an image sensor lighting unit that scans a sheet to acquire the optical image information of the sheet. Thus, the following embodiments describe examples in which the concept of the present disclosure is applied to such image sensor lighting units. The same components or components having similar functions in the following description are commonly assigned with the same reference sign throughout the drawings as appropriate, and description thereof is omitted as appropriate.

Embodiment 1

<Structure of Image Sensor Lighting Unit>

Figure 2:
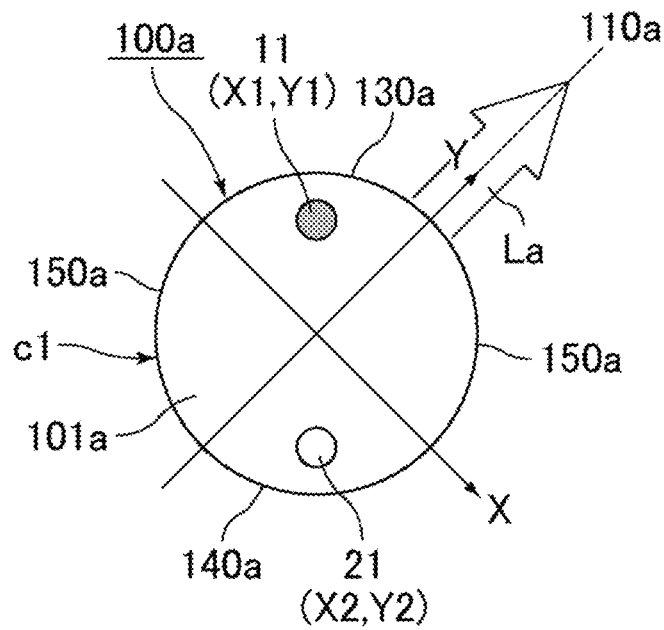
FIG. 2 is a transparent schematic view showing an arrangement of first and second light sources with the image sensor lighting unit of Embodiment 1 viewed from one side.
Figure 3:
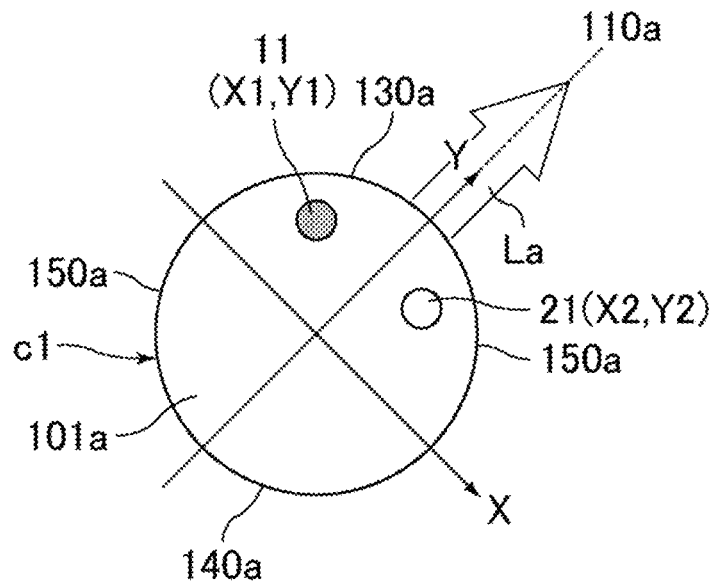
FIG. 3 is a transparent schematic view showing another arrangement of the first and second light sources with the image sensor lighting unit of Embodiment 1 viewed from one side.

The structure of an image sensor lighting unit 1a of the present embodiment is described with reference to FIG. 1 to FIG. 3. As shown in FIG. 1 to FIG. 3, the image sensor lighting unit 1a of the present embodiment can be used for a light emitting portion of an optical line sensor, for example. The image sensor lighting unit 1a includes at least one light guide that extends in a main scanning direction D1 and emits light in a predetermined direction, e.g., a light guide 100a; a first light source group 10; and a second light source group 20. The first light source group 10 faces a first end surface of at least two end surfaces of the at least one light guide in the main scanning direction D1. The second light source group 20 faces a second end surface of the at least two end surfaces. The first light source group 10 and the second light source group 20 may respectively face a first end surface 101a and a second end surface 102a of the same light guide 100a as shown in FIG. 1 or may respectively face a first end surface of a first light guide and a second end surface of a second light guide. In the latter case, the first end surface of the first light guide and the second end surface of the second light guide may be on the same side (one side) in the main scanning direction D1 or on the opposite sides (both sides) in the main scanning direction D1. The light guide 100a includes the first end surface 101a and the second end surface 102a respectively positioned at one end and the other end in the main scanning direction D1.

The first end surface and the second end surface on which light from the first light source group 10 and light from the second light source group 20 are respectively incident may each have a substantially circular shape, for example, and can function as incidence surfaces on which light from a light source is incident.

The light source groups 10 and 20 may each include a plurality of light sources capable of emitting lights having different wavelength bands, for example, and these groups may each be capable of emitting lights having different wavelength bands (e.g., green light and infrared light). The light sources in each of the light source groups 10 and 20 may each be a point light source and can be a light emitting diode (LED), for example.

The first light source group 10 includes a first light source 11 that emits light having a predetermined wavelength band. The second light source group 20 includes a second light source 21 that emits light having the same wavelength band as the light from the first light source 11 (i.e., light having the predetermined wavelength band). In other words, the first light source 11 and the second light source 21 emit lights having the same wavelength band and can usually be LEDs of the same type. The first light source group 10 may include one or more light sources 12 as well as the first light source 11. The second light source group 20 may include one or more light sources 22 as well as the second light source 21.

Each light guide guides light from the first light source group 10 and/or the second light source group 20 to apply linear light to a sheet, which is an irradiation target (illumination target); each light guide is an optical component that linearizes light from each of the light source groups. Each light guide may have a thin rod-like shape extending in the main scanning direction D1 of the image sensor lighting unit 1 (specifically, for example, cylindrical shape with circular end surfaces) and may be formed from, for example, a transparent resin such as an acrylic resin.

Each light guide may be provided on its side surface with an emission surface that emits light, a diffusion surface opposite the emission surface, and two coupling surfaces between the emission surface and the diffusion surface. For example, the light guide 100a may be provided on its side surface with an emission surface 130a that emits light, a diffusion surface 140a positioned opposite the emission surface 130a, two coupling surfaces 150a between the emission surface 130a and the diffusion surface 140a. The diffusion surface functions as a reflection surface that reflects light incident thereon toward the emission surface. The emission surface functions as a surface that emits the light reflected by the diffusion surface toward a sheet. The emission surface and the diffusion surface may each be a band-shaped surface extending in the main scanning direction D1. The diffusion surface may have a white pattern. The white pattern can be, for example, formed by coating the diffusion surface with a white coating material. More specifically, the white pattern may be a dashed-line pattern extending in the main scanning direction D1 with the segments defining the dashed lines each becoming longer as they are closer to the center of the light guide in the main scanning direction D1.

Light incident on the first end surface from the first light source group 10 may propagate inside the light guide with the first end surface, be reflected by the diffusion surface, and be emitted from the emission surface toward a sheet. Also, light incident on the second end surface from the second light source group 20 may propagate inside the light guide with the second end surface, be reflected by the diffusion surface, and be emitted from the emission surface toward a sheet. For example, as shown in FIG. 1, light incident on the first end surface 101a from the first light source group 10 and light incident on the second end surface 102a from the second light source group 20 may propagate inside the light guide 100a, be reflected by the diffusion surface 140a, and be emitted from the emission surface 130a toward a sheet.

Hereinbelow, the positional relationship between light sources of different light source groups is described in more detail. Here, an XY-coordinate system consisting of a Y-axis and an X-axis is set with at least one light guide viewed from the first end surface side in the main scanning direction D1. The Y-axis is on the optical axis of emitted light and is positive in the traveling direction of the light. The X-axis is formed by rotating the Y-axis clockwise by 90° with the center of an end surface of the corresponding light guide in the main scanning direction D1 taken as the axis of rotation. This XY-coordinate system is set, with each light guide viewed from the first end surface side, i.e., the same side (one side) of a light guide in the main scanning direction D1, on each light guide (which may be on the end surface of each light guide on the viewer's side). The Y-axis is set on the optical axis of light emitted from the light guide on which the axis is set. The axis of rotation about which the Y-axis is rotated is set at the center of one end surface or the other end surface of the light guide on which the axis is set. For example, as shown in FIG. 2 and FIG. 3, with the light guide 100a viewed from the first end surface 101a side in the main scanning direction D1, an XY-coordinate system c1 consisting of a Y-axis and an X-axis may be set with its Y-axis set on the optical axis of emitted light and being positive in the traveling direction of the light and its X-axis formed by rotating the Y-axis clockwise by 90° with the center of an end surface of the corresponding light guide in the main scanning direction D1 taken as the axis of rotation. In other words, with the light guide 100a viewed from the first end surface 101a side in the main scanning direction D1, the XY-coordinate system c1 may be set on the light guide 100a. The Y-axis of the XY-coordinate system c1 may be on the optical axis 110a of emission light La from the light guide 100a and be positive in the traveling direction of the emission light La. The X-axis of the XY-coordinate system c1 may be formed by rotating the Y-axis clockwise by 90° with the center of the first end surface 101a as the axis of rotation.

The axis of rotation may be the center of either of the two end surfaces of the light guide in the main scanning direction. In the case of setting the XY-coordinate system c1, the axis of rotation may be the center of the first end surface 101a or the center of the second end surface 102a. The shape of each end surface of each light guide is not limited, and may be, for example, a circular shape, an elliptical shape, or an elliptical shape whose end on one side in its major axis direction is partially removed. The end surfaces (one end surface and the other end surface) of the same light guide may have the same shape.

Here, the "center of an end surface" means the center of the outer shape of the end surface. When the end surface has a circular or elliptical shape, the center of the end surface is the center of the circular or elliptical shape. As shown in the later-described FIG. 8, when the end surface has an elliptical shape whose end on one side in its major axis direction is partially removed, the center LX of the end surface is the midpoint of the major axis L1. In this case, the light guide has a shape obtained by cutting part of an elliptic cylinder along a plane perpendicular to the end surface (plane parallel to the height direction), and a diffusion surface is formed on the surface obtained by the cutting.

Figure 4:
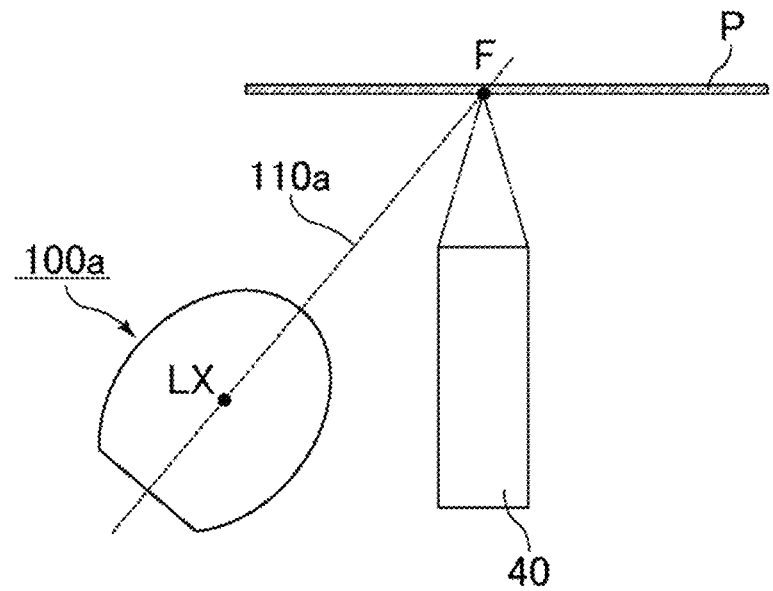
FIG. 4 is a view showing the optical axis of the image sensor lighting unit of Embodiment 1.

The "optical axis of emitted light" means, with the light guide emitting the light viewed in the main scanning direction D1, a line connecting the center of the outer shape of the light guide and the focus position (medium reading position) of a lens such as a rod lens array in the image sensor lighting unit 1a. For example, as shown in FIG. 4, the optical axis 110a of light emitted from the light guide 100a, with the light guide 100a viewed in the main scanning direction D1, the line connecting the center LX of the outer shape of the light guide 100a and the focus position (medium reading position) F of a lens such as a rod lens array 40 in the image sensor lighting unit 1. A sheet P is placed at the position where the focus position and the optical axis intersect. Also, as shown in FIG. 4, when each end surface of the light guide has an elliptical shape or an elliptical shape whose end on one side in the major axis direction is partially removed, the optical axis may be set on the major axis of the elliptical shape of each end surface.

As shown in FIG. 2 and FIG. 3, the X-coordinate and the Y-coordinate of the first light source 11 in the corresponding XY-coordinate system, i.e., the XY-coordinate system c1, are respectively referred to as X1 and Y1. The X-coordinate and the Y-coordinate of the second light source 21 in the corresponding XY-coordinate system, i.e., the XY-coordinate system c1, are respectively referred to as X2 and Y2. The coordinates of each light source may be set at the coordinates of the center of the outer shape of each light source. Each light source may be, for example, a square LED chip. The outer shape of each light source may be a square shape.

As shown in FIG. 2 and FIG. 3, in the present embodiment, the X-coordinate of the first light source 11 in the corresponding XY-coordinate system is equal in absolute value to the X-coordinate of the second light source 21 in the corresponding XY-coordinate system. In other words, the first light source 11 and the second light source 21 are arranged such that the X-coordinate X1 of the first light source 11 is equal in absolute value to the X-coordinate X2 of the second light source 21. This can increase the uniformity of light from the light guide in the main scanning direction D1 when the light sources 11 and 21 each are positioned off the center of the corresponding end surface of the light guide. Here, the "uniformity of emission light" is a physical property based on the difference in intensity between the light component with the highest intensity from the light guide and the light component with the lowest intensity from the light guide. When the difference in intensity is large, the uniformity of emission light is low. When the difference in intensity is small, the uniformity of emission light is high. Also, the "corresponding XY-coordinate system" means the XY-coordinate system set on a light guide having the end surface that the light source faces. As described above, the X-coordinate X1 of the first light source 11 is equal in absolute value to the X-coordinate X2 of the second light source 21. This means that, for example, lights having the above wavelength band from the first light source 11 and the second light source 21 are applied to the light guide 100a from equal distances relative to the optical axis 110a of the light guide 100a. This structure enables lights to be incident evenly relative to the optical axis 110a as compared to the cases where the lights are applied to the light guide 100a from different distances relative to the optical axis 110a of the light guide 100a.

Herein, the expression "the X-coordinates (or Y-coordinates) are equal in absolute value to each other" encompasses the cases where the X-coordinates (or Y-coordinates) are substantially equal in absolute value to each other, and the cases where the coordinates are different in absolute value from each other by an error in manufacturing. The expression "X-coordinates (or Y-coordinates) are equal to each other" encompasses the cases where the X-coordinates (or Y-coordinates) are substantially equal to each other and the cases where the coordinates are different by an error in manufacturing.

As shown in FIG. 2 and FIG. 3, the light sources 11 and 12 may each be off the origin of the corresponding XY-coordinate system. For example, the first light source 11 and the second light source 21 may each be off the origin of the XY-coordinate system c1 of the light guide 100a. Such a structure in the present embodiment can also increase the uniformity of light from the light guide in the main scanning direction D1.

As shown in FIG. 2 and FIG. 3, the X-coordinate of the first light source 11 in the corresponding XY-coordinate system may be different in sign from the X-coordinate of the second light source 21 in the corresponding XY-coordinate system. In other words, the first light source 11 and the second light source 21 may be arranged such that the X-coordinate X1 of the first light source 11 is different in sign from the X-coordinate X2 of the second light source 21. This mode can, for example, apply lights having the predetermined wavelength band from the first light source 11 and the second light source 21 to the diffusion surface 140a of the light guide 100a from both sides of the optical axis 110a of the light guide 100a. As a result, the uniformity of light from the light guide 100a in the main scanning direction D1 can be more increased. As described above, in the present embodiment, the first light source 11 and the second light source 21 can be arranged horizontally equally relative to the optical axis 110a, so that the diffusion surface 140a can be irradiated with lights uniformly. This can distribute the light sources on both sides of the optical axis, not collectively in a certain region, thus balancing the arrangement of the light sources in a limited space. This structure can therefore satisfy the desired optical characteristics for each wavelength band when lights having different wavelength bands are emitted.

The Y-coordinate of the first light source 11 in the corresponding XY-coordinate system may be equal in absolute value to the Y-coordinate of the second light source 21 in corresponding the XY-coordinate system. In other words, the first light source 11 and the second light source 21 may be arranged such that the Y-coordinate Y1 of the first light source 11 is equal in absolute value to the Y-coordinate Y2 of the second light source 21.

As shown in FIG. 2, the Y-coordinate of the first light source 11 in the corresponding XY-coordinate system may be different in sign from the Y-coordinate of the second light source 21 in the corresponding XY-coordinate system. In other words, the first light source 11 and the second light source 21 may be arranged such that the Y-coordinate Y1 of the first light source 11 is different in sign from the Y-coordinate Y2 of the second light source 21.

As described above, the first light source 11 and the second light source 21 may be symmetric about the origin of the XY-coordinate system c1.

As shown in FIG. 3, the Y-coordinate of the first light source 11 in the corresponding XY-coordinate system may be equal to the Y-coordinate of the second light source 21 in the corresponding XY-coordinate system. In other words, the first light source 11 and the second light source 21 may be arranged such that the Y-coordinate Y1 of the first light source 11 is equal to the Y-coordinate Y2 of the second light source 21.

As described above, the first light source 11 and the second light source 21 may be symmetric about the Y-axis of the XY-coordinate system c1.

Embodiment 2

<Summary of the Present Embodiment>

Figure 5:
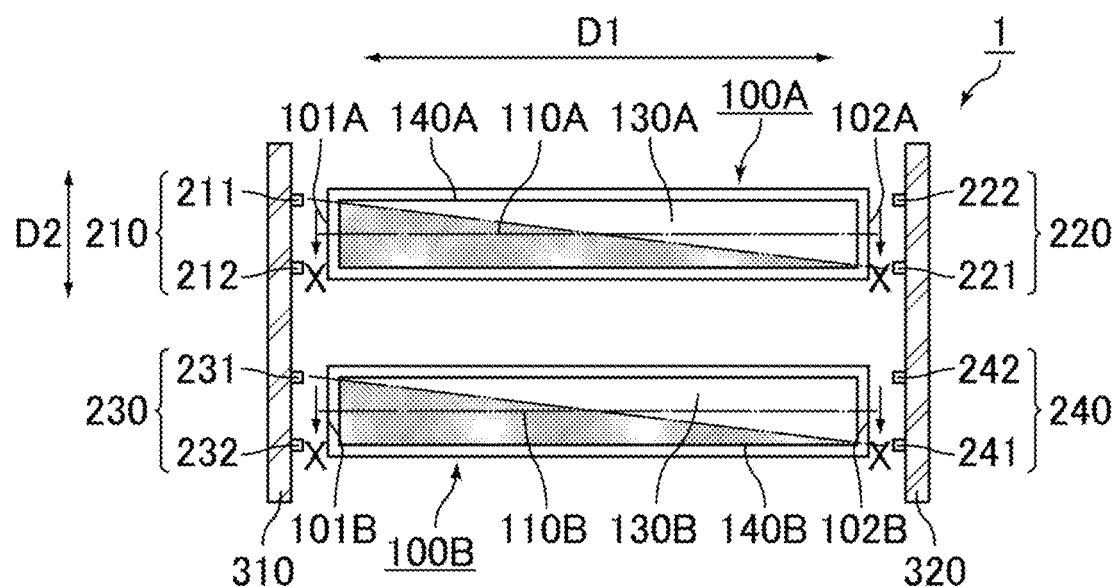
FIG. 5 is a schematic plan view of an image sensor lighting unit of Embodiment 2 as viewed from an emission surface side of a light guide.

First, the present embodiment is summarized with reference to FIG. 5. As shown in FIG. 5, in an image sensor lighting unit 1 of the present embodiment, a first light source 211 and a second light source 221 that emit lights having the same wavelength band respectively face a first end surface 101A and a second end surface 102A of a light guide 100A and are at equal distances from an optical axis 110A of light emitted from an emission surface 130A of the light guide 100A, i.e., the emission light. Thus, lights having the above wavelength band from the first light source 211 and the second light source 221 are applied to the light guide 100A from equal distances relative to the optical axis 110A of the light guide 100A. This structure enables lights to be incident evenly relative to the optical axis 110A as compared to the cases where the lights are applied to the light guide 100A from different distances relative to the optical axis 110A of the light guide 100A. This can increase the uniformity of light from the light guide 100A in the main scanning direction D1 when the first light source 211 and the second light source 221 each are positioned off the center of the corresponding end surface of the light guide 100A. Also in the image sensor lighting unit 1 of the present embodiment, a third light source 231 and a fourth light source 241 that emit lights having the same wavelength band as the lights from the first light source 211 and the second light source 221 respectively face a third end surface 101B and a fourth end surface 102B of a light guide 100B and are at equal distances from an optical axis 110B of light emitted from an emission surface 130B of the light guide 100B, i.e., the emission light. This, as in the case of the light guide 100A, can increase the uniformity of light from the light guide 100B in the main scanning direction D1 when the third light source 231 and the fourth light source 241 each are positioned off the center of the corresponding end surface of the light guide 100B. As a result, the uniformity of light from each of the light guides 100A and 100B can be stably increased when the two light guides 100A and 100B are simultaneously irradiated with lights.

<Structure of Image Sensor Lighting Unit>

Figure 6:
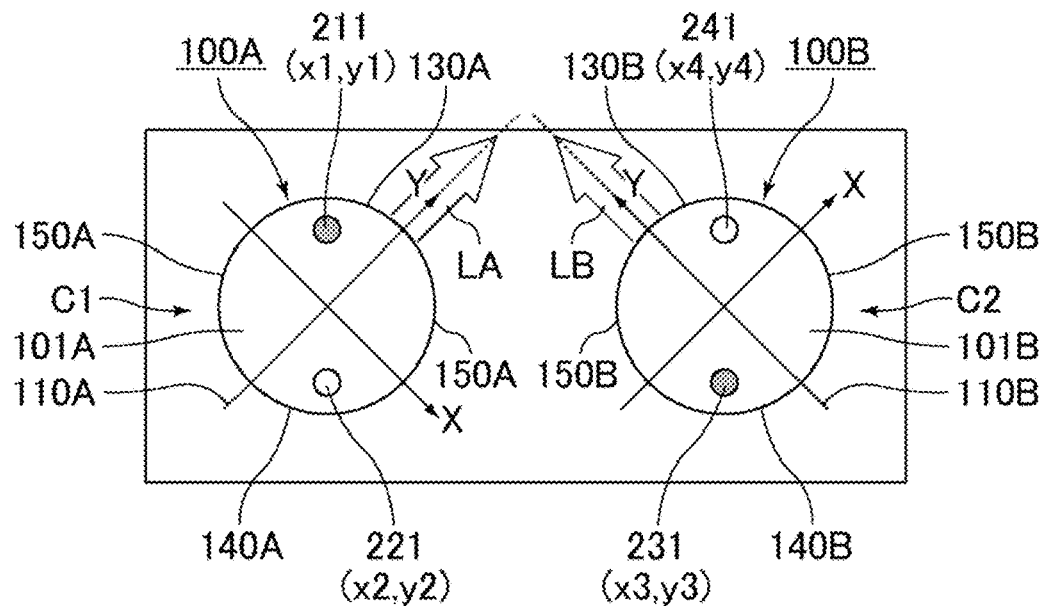
FIG. 6 is a transparent schematic view of the image sensor lighting unit of Embodiment 2 as viewed from a first substrate side, showing an arrangement of first to fourth light sources.
Figure 7:
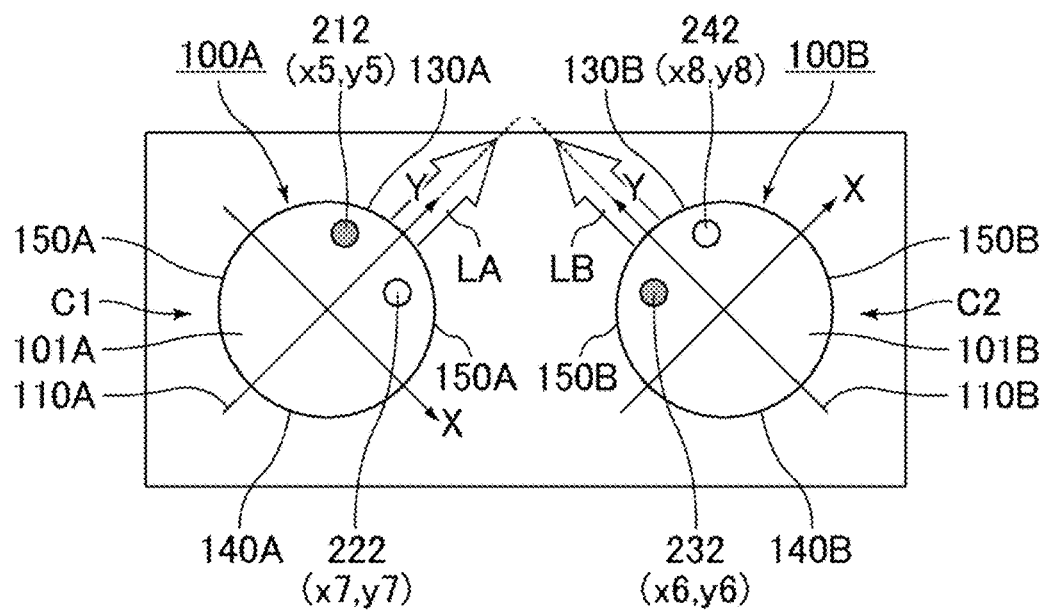
FIG. 7 is a transparent schematic view of the image sensor lighting unit of Embodiment 2 as viewed from the first substrate side, showing an arrangement of fifth to eighth light sources.

The structure of the image sensor lighting unit 1 of the present embodiment is described in more detail with reference to FIG. 5 to FIG. 10. As shown in FIG. 5 to FIG. 7, the image sensor lighting unit 1 of the present embodiment can be used for a light emitting portion of an optical line sensor, for example. The image sensor lighting unit 1 includes the first light guide 100A and the second light guide 100B that extend in the main scanning direction D1 and emit lights in respective predetermined directions. The first light guide 100A includes the first end surface 101A and the second end surface 102A respectively at one end and the other end in the main scanning direction D1. The second light guide 100B includes the third end surface 101B and the fourth end surface 102B respectively at one end and the other end in the main scanning direction D1. The third end surface 101B is one of the two end surfaces of the second light guide 100B in the main scanning direction D1, which is closer to the first end surface 101A. The fourth end surface 102B is one of the two end surfaces of the second light guide 100B in the main scanning direction D1, which is closer to the second end surface 102A. In the present embodiment, the first end surface 101A of the first light guide 100A is adjacent to the third end surface 101B of the second light guide 100B, and the second end surface 102A of the first light guide 100A is adjacent to the fourth end surface 102B of the second light guide 100B. The image sensor lighting unit 1 also includes a first substrate 310 that faces the first end surface 101A of the first light guide 100A and the third end surface 101B of the second light guide 100B, and a second substrate 320 that faces the second end surface 102A of the first light guide 100A and the fourth end surface 102B of the second light guide 100B.

The first substrate 310 and the second substrate 320 are quadrilateral circuit substrates on which light sources are mounted. The first substrate 310 has a first light source group 210 facing the first end surface 101A of the first light guide 100A and a third light source group 230 facing the third end surface 101B of the second light guide 100B. The second substrate 320 has a second light source group 220 facing the second end surface 102A of the first light guide 100A and a fourth light source group 240 facing the fourth end surface 102B of the second light guide 100B.

The first, second, third, and fourth end surfaces 101A, 102A, 101B, and 102B on which lights from the first, second, third, and fourth light source groups 210, 220, 230, and 240 are respectively incident each have a substantially circular shape, for example, and function as incidence surfaces on which lights from the respective light sources are incident.

The light source groups 210, 220, 230, and 240 each include light sources capable of emitting lights having different wavelength bands, for example, and can each emit light having different wavelength bands (e.g., green light and infrared light). The light sources in each of the light source groups 210, 220, 230, and 240 each are a point light source and can be a light emitting diode (LED), for example.

The first light source group 210 includes the first light source 211 that emits light having a predetermined wavelength band. The second light source group 220, the third light source group 230, and the fourth light source group 240 respectively include the second light source 221, the third light source 231, and the fourth light source 241 that emit lights having the same wavelength band as the light from the first light source 211 (lights having the predetermined wavelength band). In other words, the first light source 211, the second light source 221, the third light source 231, and the fourth light source 241 emit lights having the same wavelength band and can usually be LEDs of the same type.

The first light source group 210 also includes a fifth light source 212 that emits light having a different wavelength band from the first to fourth light sources 211, 221, 231, and 241. The third light source group 230, the second light source group 220, and the fourth light source group 240 respectively include a sixth light source 232, a seventh light source 222, and an eighth light source 242 that emit lights having the same wavelength band as the light from the fifth light source 212. In other words, the fifth light source 212, the sixth light source 232, the seventh light source 222, and the eighth light source 242 emit lights having the same wavelength band and can usually be LEDs of the same type.

The first light guide 100A guides lights from the first light source group 210 and the second light source group 220 to apply linear lights to a sheet, which is an irradiation target (illumination target). The second light guide 100B guides lights from the third light source group 230 and the fourth light source group 240 to apply linear lights to the sheet. The first light guide 100A and the second light guide 100B each are an optical component that linearizes lights from the corresponding light source groups. The first and second light guides 100A and 100B each have a thin rod-like shape extending in the main scanning direction D1 of the image sensor lighting unit 1 (specifically, for example, cylindrical shape with circular end surfaces) and is formed from, for example, a transparent resin such as an acrylic resin.

The first light guide 100A is provided on its side surface with an emission surface 130A that emits light, a diffusion surface 140A opposite the emission surface 130A, and two coupling surfaces 150A between the emission surface 130A and the diffusion surface 140A. Similarly, the second light guide 100B is provided on its side surface with an emission surface 130B that emits light, a diffusion surface 140B opposite the emission surface 130B, and two coupling surfaces 150B between the emission surface 130B and the diffusion surface 140B. The diffusion surfaces 140A and 140B respectively function as reflection surfaces that reflect light incident thereon toward the emission surfaces 130A and 130B. The emission surfaces 130A and 130B respectively function as surfaces that emit the lights reflected by the diffusion surfaces 140A and 140B toward a sheet. The emission surfaces 130A and 130B and the diffusion surfaces 140A and 140B each are a band-shaped surface extending in the main scanning direction D1. The diffusion surfaces 140A and 140B each have a white pattern. The white pattern can be, for example, formed by coating a diffusion surface with a white coating material. More specifically, the white pattern is a dashed-line pattern extending in the main scanning direction D1 with the segments defining the dashed lines each becoming longer as they are closer to the center of the light guide in the main scanning direction D1.

Light incident on the first end surface 101A from the first light source group 210 and light incident on the second end surface 102A from the second light source group 220 propagate inside the first light guide 100A, are reflected by the diffusion surface 140A, and are emitted from the emission surface 130A toward a sheet. Also, light incident on the third end surface 101B from the third light source group 230 and light incident on the fourth end surface 102B from the fourth light source group 240 propagate inside the second light guide 100B, are reflected by the diffusion surface 140B, and are emitted from the emission surface 130B.

Hereinbelow, the positional relationship between light sources of different light source groups is described in more detail. Here, as shown in FIG. 6 and FIG. 7, an XY-coordinate system consisting of a Y-axis and an X-axis is set with the first and second light guides 100A and 100B viewed from the first end surface 101A side in the main scanning direction D1. The Y-axis is on the optical axis of emitted light and is positive in the traveling direction of the light. The X-coordinate is formed by rotating the Y-axis clockwise by 90° with the center of an end surface of the corresponding light guide in the main scanning direction D1 taken as the axis of rotation. In other words, an XY-coordinate system C1 is set on the first light guide 100A with the first light guide 100A viewed from the first end surface 101A side in the main scanning direction D1. The Y-axis of the XY-coordinate system C1 is on the optical axis 110A of emission light LA from the first light guide 100A and is positive in the traveling direction of the emission light LA. The X-axis of the XY-coordinate system C1 is formed by rotating the Y-axis clockwise by 90° with the center of the first end surface 101A taken as the axis of rotation. Similarly, an XY-coordinate system C2 is set on the second light guide 100B with the second light guide 100B viewed from the first end surface 101A side in the main scanning direction D1. The Y-axis of the XY-coordinate system C2 is on the optical axis 110B of emission light LB from the second light guide 110B and is positive in the traveling direction of the emission light LB. The X-axis of the XY-coordinate system C2 is formed by rotating the Y-axis clockwise by 90° with the center of the third end surface 101B taken as the axis of rotation.

Figure 8:
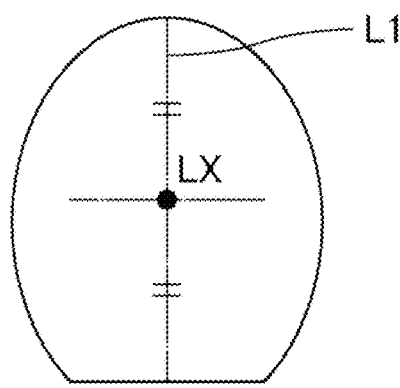
FIG. 8 is a view showing the center of an end surface of the image sensor lighting unit of Embodiment 2.

The axis of rotation may be the center of either of the two end surfaces of the light guide in the main scanning direction. In the case of setting the XY-coordinate system C1, the axis of rotation may be the center of the first end surface 101A or the center of the second end surface 102A. In the case of setting the XY-coordinate system C2, the axis of rotation may be the center of the third end surface 101B or the center of the fourth end surface 102B. The shape of each end surface of each of the first and second light guides 100A and 100B is not limited, and may be, for example, a circular shape, an elliptical shape, or an elliptical shape whose end on side in its major axis direction is partially removed. The end surfaces of each of the first and second light guides 100A and 100B usually have the same shape. The "center of an end surface" means the center of the outer shape of the end surface. When the end surface has a circular or elliptical shape, the center of the end surface is the center of the circular or elliptical shape. As shown in FIG. 8, when the end surface has an elliptical shape whose end on one side in its major axis direction is partially removed, the center LX of the end surface is the midpoint of the major axis L1. In this case, the first and second light guides 100A and 100B each have a shape obtained by cutting part of an elliptic cylinder along a plane perpendicular to the end surface (plane parallel to the height direction), and the diffusion surfaces 140A and 140B are formed on the respective surfaces obtained by the cutting.

Figure 9:
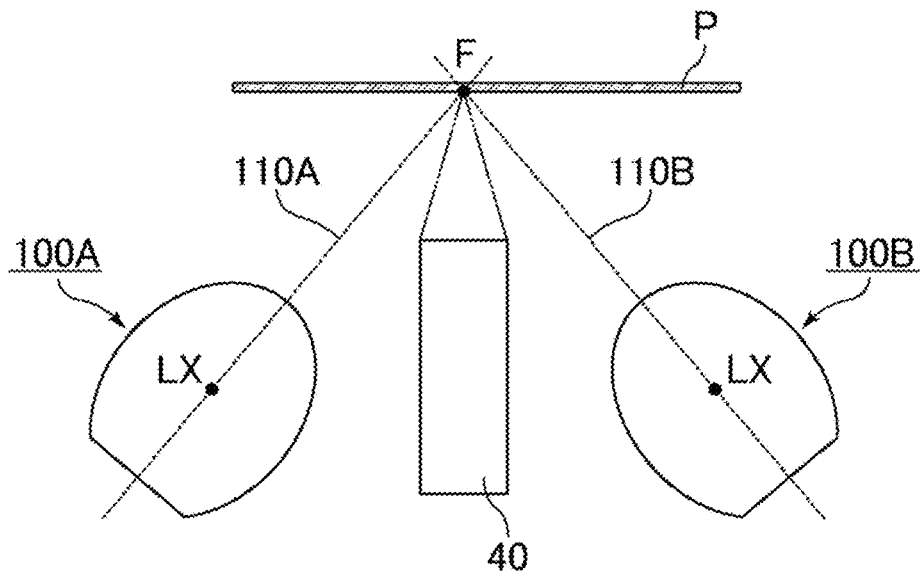
FIG. 9 is a view showing the optical axes of the image sensor lighting unit of Embodiment 2.

As shown in FIG. 9, the optical axes 110A and 110B are, with the first light guide 100A and the second light guide 100B viewed in the main scanning direction D1, the lines connecting the center LX of the outer shape of each of the light guides 100A and 100B and the focus position (medium reading position) F of a lens, e.g., the rod lens array 40, in the image sensor lighting unit 1. A sheet P is placed at the position where the focus position F and the optical axis 110A or 110B intersect. Also, as shown in FIG. 9, when each end surface of each of the first and second light guides 100A and 100B has an elliptical shape or an elliptical shape whose end on side in the major axis direction is partially removed, the optical axes 110A and 110B may be set on the major axes of the elliptical shapes of the respective end surfaces.

As shown in FIG. 6 and FIG. 7, the X-coordinate and the Y-coordinate of the first light source 211 in the corresponding XY-coordinate system, i.e., the XY-coordinate system C1, are respectively referred to as x1 and y1. The X-coordinate and the Y-coordinate of the second light source 221 in the corresponding XY-coordinate system, i.e., the XY-coordinate system C1, are respectively referred to as x2 and y2. The X-coordinate and the Y-coordinate of the third light source 231 in the corresponding XY-coordinate system, i.e., the XY-coordinate system C2, are respectively referred to as x3 and y3. The X-coordinate and the Y-coordinate of the fourth light source 241 in the corresponding XY-coordinate system, i.e., the XY-coordinate system C2, are respectively referred to as x4 and y4. The X-coordinate and the Y-coordinate of the fifth light source 212 in the corresponding XY-coordinate system, i.e., the XY-coordinate system C1, are respectively referred to as x5 and y5. The X-coordinate and the Y-coordinate of the sixth light source 232 in the corresponding XY-coordinate system, i.e., the XY-coordinate system C2, are respectively referred to as x6 and y6. The X-coordinate and the Y-coordinate of the seventh light source 222 in the corresponding XY-coordinate system, i.e., the XY-coordinate system C1, are respectively referred to as x7 and y7. The X-coordinate and the Y-coordinate of the eighth light source 242 in the corresponding XY-coordinate system, i.e., the XY-coordinate system C2, are respectively referred to as x8 and y8. The coordinates of each light source are set based on the coordinates of the center of the outer shape of each light source. Each light source may be, for example, a square LED chip. The outer shape of each light source may be a square shape.

As shown in FIG. 6, in the present embodiment, the X-coordinate of the first light source 211 in the corresponding XY-coordinate system is equal in absolute value to the X-coordinate of the second light source 221 in the corresponding XY-coordinate system. In other words, the first light source 211 and the second light source 221 are arranged such that the X-coordinate x1 of the first light source 211 is equal in absolute value to the X-coordinate x2 of the second light source 221. This means that, for example, lights having the above wavelength band from the first light source 211 and the second light source 221 are applied to the light guide 100A from equal distances relative to the optical axis 110A of the light guide 100A. This structure enables lights to be incident evenly relative to the optical axis 110A as compared to the cases where the lights are applied to the light guide 100A from different distances relative to the optical axis 110A of the light guide 100A. Thus, the structure can increase the uniformity of light from the light guide 100A in the main scanning direction D1 when the first light source 211 and the second light source 221 each are positioned off the center of the corresponding end surface of the light guide 100A.

Also, in the image sensor lighting unit 1 of the present embodiment, the X-coordinate of the third light source 231 in the corresponding XY-coordinate system is equal in absolute value to the X-coordinate of the fourth light source 241 in the corresponding XY-coordinate system. In other words, the third light source 231 and the fourth light source 241 are arranged such that the X-coordinate x3 of the third light source 231 is equal in absolute value to the X-coordinate x4 of the fourth light source 241. This structure, with the third light source 231 and the fourth light source 241 arranged in the same manner as for the first light source 211 and the second light source 221, can achieve the same effect as the arrangement of the first light source 211 and the second light source 221. In other words, this structure can increase the uniformity of light from the light guide 100B in the main scanning direction D1 when the third light source 231 and the fourth light source 241 each are positioned off the center of the corresponding end surface of the light guide 100B.

As shown in FIG. 7, in the image sensor lighting unit 1 of the present embodiment, the X-coordinate of the fifth light source 212 in the corresponding XY-coordinate system is equal in absolute value to the X-coordinate of the seventh light source 222 in the corresponding XY-coordinate system. In other words, the fifth light source 212 and the seventh light source 222 are arranged such that the X-coordinate x5 of the fifth light source 212 is equal in absolute value to the X-coordinate x7 of the seventh light source 222. This structure, with the fifth light source 212 and the seventh light source 222 arranged in the same manner as for the first light source 211 and the second light source 221, can achieve the same effect as the above arrangement of the first light source 211 and the second light source 221. In other words, this structure can increase the uniformity of light from the light guide 100A in the main scanning direction D1 when the fifth light source 212 and the seventh light source 222 each are positioned off the center of the corresponding end surface of the light guide 100A.

In the image sensor lighting unit 1 of the present embodiment, the X-coordinate of the sixth light source 232 in the corresponding XY-coordinate system is equal in absolute value to the X-coordinate of the eighth light source 242 in the corresponding XY-coordinate system. In other words, the sixth light source 232 and the eighth light source 242 are arranged such that the X-coordinate x6 of the sixth light source 232 is equal in absolute value to the X-coordinate x8 of the eighth light source 242. This structure, with the sixth light source 232 and the eighth light source 242 arranged in the same manner as for the first light source 211 and the second light source 221, can achieve the same effect as the arrangement of the first light source 211 and the second light source 221. In other words, this structure can increase the uniformity of light from the light guide 100B in the main scanning direction D1 when the sixth light source 232 and the eighth light source 242 each are positioned off the center of the corresponding end surface of the light guide 100B.

As shown in FIG. 6, the first light source 211 and the second light source 221 each are off the origin of the XY-coordinate system on the first light guide 100A. Also, the third light source 231 and the fourth light source 241 each are off the origin of the XY-coordinate system on the second light guide 100B. As described above, in the present embodiment, the first light source 211 and the second light source 221 that emit lights having the predetermined wavelength band are respectively positioned off the center of the first end surface 101A and the center of the second end surface 102A of the first light guide 100A, and the third light source 231 and the fourth light source 241 are respectively positioned off the center of the third end surface 101B and the fourth end surface 102B of the second light guide 100B. Even with this structure, the present embodiment can increase the uniformity of light from the light guide 100A in the main scanning direction D1 and the uniformity of light from the light guide 100B in the main scanning direction D1.

Also, as shown in FIG. 7, the fifth light source 212 and the seventh light source 222 each are off the origin of the XY-coordinate system on the first light guide 100A. Also, the sixth light source 232 and the eighth light source 242 each are off the origin of the XY-coordinate system on the second light guide 100B. As described above, in the present embodiment, the fifth light source 212 and the seventh light source 222 that emit lights having the predetermined wavelength band are respectively positioned off the center of the first end surface 101A and the center of the second end surface 102A of the first light guide 100A, and the sixth light source 232 and the eighth light source 242 are respectively positioned off the center of the third end surface 101B and the center of the fourth end surface 102B of the second light guide 100B. Even with this structure, the present embodiment can increase the uniformity of light from the light guide 100A in the main scanning direction D1 and the uniformity of light from the light guide 100B in the main scanning direction D1.

As shown in FIG. 6, the X-coordinate of the first light source 211 in the corresponding XY-coordinate system is different in sign from the X-coordinate of the second light source 221 in the corresponding XY-coordinate system. In other words, the first light source 211 and the second light source 221 are arranged such that the X-coordinate x1 of the first light source 211 is different in sign from the X-coordinate x2 of the second light source 221. This mode can, for example, apply lights having the predetermined wavelength band from the first light source 211 and the second light source 221 to the diffusion surface 140A of the light guide 100A from both sides of the optical axis 110A of the light guide 100A. As a result, the uniformity of light from the light guide 100A in the main scanning direction D1 can be increased. As described above, in the present embodiment, the first light source 211 and the second light source 221 can be arranged horizontally equally relative to the optical axis 110A, so that the diffusion surface 140A can be irradiated with lights uniformly. This can distribute the light sources on both sides of the optical axis, not collectively in a certain region, thus balancing the arrangement of the light sources in a limited space. This structure can therefore satisfy the desired optical characteristics for each wavelength band when lights having different wavelength bands are emitted.

As with the relationship between the first light source 211 and the second light source 221, the X-coordinate of the third light source 231 in the corresponding XY-coordinate system is different in sign from the X-coordinate of the fourth light source 241 in the corresponding XY-coordinate system. In other words, the third light source 231 and the fourth light source 241 are arranged such that the X-coordinate x3 of the third light source 231 is different in sign from the X-coordinate x4 of the fourth light source 241. This mode can achieve the same effect as the mode with the first light source 211 and the second light source 221. In other words, this mode can increase the uniformity of light from the light guide 100B in the main scanning direction D1. The mode can therefore satisfy the desired optical characteristics for each wavelength band when lights having different wavelength bands are emitted.

The Y-coordinate of the first light source 211 in the corresponding XY-coordinate system is equal in absolute value to the Y-coordinate of the second light source 221 in the corresponding XY-coordinate system. In other words, the first light source 211 and the second light source 221 are arranged such that the Y-coordinate y1 of the first light source 211 is equal in absolute value to the Y-coordinate y2 of the second light source 221.

As with the relationship between the first light source 211 and the second light source 221, the Y-coordinate of the third light source 231 in the corresponding XY-coordinate system is equal in absolute value to the Y-coordinate of the fourth light source 241 in the corresponding XY-coordinate system. In other words, the third light source 231 and the fourth light source 241 are arranged such that the Y-coordinate y3 of the third light source 231 is equal in absolute value to the Y-coordinate y4 of the fourth light source 241.

The Y-coordinate of the first light source 211 in the corresponding XY-coordinate system is different in sign from the Y-coordinate of the second light source 221 in the corresponding XY-coordinate system. In other words, the first light source 211 and the second light source 221 are arranged such that the Y-coordinate y1 of the first light source 211 is different in sign from the Y-coordinate y2 of the second light source 221.

As with the relationship between the first light source 211 and the second light source 221, the Y-coordinate of the third light source 231 in the corresponding XY-coordinate system is different in sign from the Y-coordinate of the fourth light source 241 in the corresponding XY-coordinate system. In other words, the third light source 231 and the fourth light source 241 are arranged such that the Y-coordinate y3 of the third light source 231 is different in sign from the Y-coordinate y4 of the fourth light source 241.

As described above, the first light source 211 and the second light source 221 are symmetric about the origin of the XY-coordinate system C1, and the third light source 231 and the fourth light source 241 are symmetric about the origin of the XY-coordinate system C2.

As shown in FIG. 7, the X-coordinate of the fifth light source 212 in the corresponding XY-coordinate system is different in sign from the X-coordinate of the seventh light source 222 in the corresponding XY-coordinate system. In other words, the fifth light source 212 and the seventh light source 222 are arranged such that the X-coordinate x5 of the fifth light source 212 is different in sign from the X-coordinate x7 of the seventh light source 222.

As with the relationship between the fifth light source 212 and the seventh light source 222, the X-coordinate of the sixth light source 232 in the corresponding XY-coordinate system is different in sign from the X-coordinate of the eighth light source 242 in the corresponding XY-coordinate system. In other words, the sixth light source 232 and the eighth light source 242 are arranged such that the X-coordinate x6 of the sixth light source 232 is different in sign from the X-coordinate x8 of the eighth light source 242.

The Y-coordinate of the fifth light source 212 in the corresponding XY-coordinate system is equal to the Y-coordinate of the seventh light source 222 in the corresponding XY-coordinate system. In other words, the fifth light source 212 and the seventh light source 222 are arranged such that the Y-coordinate y5 of the fifth light sources 212 is equal to the Y-coordinate y7 of the seventh light source 222.

As with the fifth light source 212 and the seventh light source 222, the Y-coordinate of the sixth light source 232 in the corresponding XY-coordinate system is equal to the Y-coordinate of the eighth light source 242 in the corresponding XY-coordinate system. In other words, the sixth light source 232 and the eighth light source 242 are arranged such that the Y-coordinate y6 of the sixth light source 232 is equal to the Y-coordinate y8 of the eighth light source 242.

As described above, the fifth light source 212 and the seventh light source 222 are symmetric about the Y-axis of the XY-coordinate system C1, and the sixth light source 232 and the eighth light source 242 are symmetric about the Y-axis of the XY-coordinate system C2.

As shown in FIG. 5 and FIG. 6, the X-coordinate of the third light source 231 in corresponding XY-coordinate system is equal to the X-coordinate of the first light source 211 in the corresponding XY-coordinate system. In other words, the first light source 211 and the third light source 231 are arranged such that the X-coordinate x1 of the first light source 211 is equal to the X-coordinate x3 of the third light source 231. In this mode, when a substrate same as the first substrate 310 on which the first light source 211 and the third light source 231 are mounted is used as the second substrate 320 with the third light source 231 thereon facing the second end surface 102A of the first light guide 100A, a light source of which the X-coordinate is equal in absolute value to and different in sign from that of the first light source 211, i.e., the second light source 221, can be arranged at the position facing the second end surface 102A, and a light source of which the X-coordinate is equal in absolute value to and different in sign from that of the third light source 231, i.e., the fourth light source 241, can be arranged at the position facing the fourth end surface 102B. As a result, common substrates can be used as the first substrate 310 and the second substrate 320. Thus, while the number of the types of components of the image sensor lighting unit 1 is reduced, the uniformity of light from the first light guide 100A in the main scanning direction D1 can be further increased by applying lights having the predetermined wavelength band from the first light source 211 and the second light source 221 to the diffusion surface 140A of the first light guide 100A from both sides of the optical axis 110A of the first light guide 100A. In addition, the uniformity of light from the second light guide 100B in the main scanning direction D1 can be increased by applying lights having the predetermined wavelength band from the third light source 231 and the fourth light source 241 to the diffusion surface 140B of the second light guide 100B from both sides of the optical axis 110B of the second light guide 100B.

Figure 10:
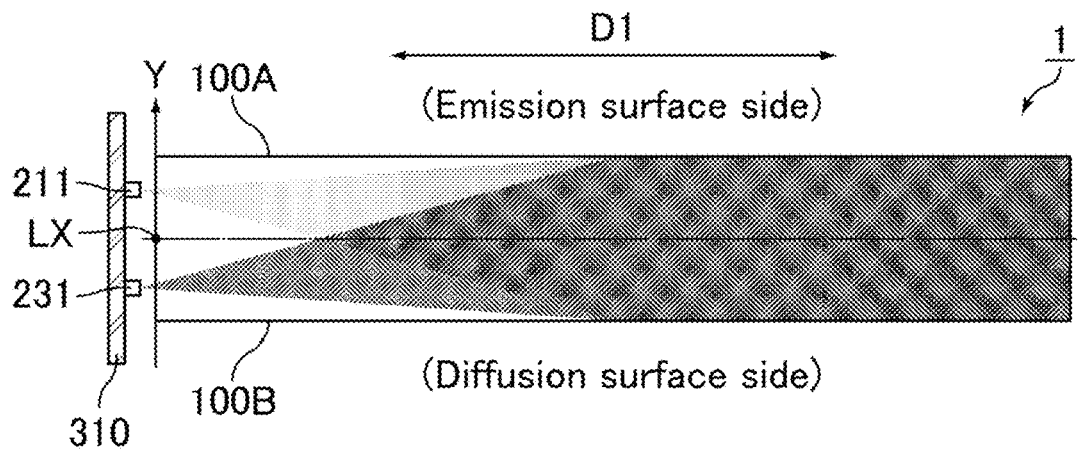
FIG. 10 is a schematic plan view of two light guides in the image sensor lighting unit of Embodiment 2 that are virtually arranged with their optical axes overlapping each other.

As shown in FIG. 6, the Y-coordinate of the first light source 211 in the corresponding XY-coordinate system is different in sign from the Y-coordinate of the third light source 231 in the corresponding XY-coordinate system. In other words, the first light source 211 and the third light source 231 are arranged such that the Y-coordinate y1 of the first light source 211 is different in sign from the Y-coordinate y3 of the third light source 231. In this mode, as shown in FIG. 10, one of the first light source 211 and the third light source 231 (the first light source 211 in the present embodiment) can be arranged closer to the emission surface relative to the X-axis of the corresponding light guide while the other light source (the third light source 231 in the present embodiment) can be arranged closer to the diffusion surface relative to the X-axis of the corresponding light guide. Thus, a light guide in which the amount of light that propagates at the end closer to the light sources is larger on the emission surface side (the first light guide 100A in the present embodiment) can be used together with a light guide in which the amount of the light is larger on the diffusion surface side (the second light guide 100B in the present embodiment). In the former light guide, the amount of light incident on the diffusion surface at the end closer to the light sources is small, while in the latter light guide, the amount of light incident on the diffusion surface at the end closer to the light sources is large. In other words, the light guides can complement between them the balance of the amount of light incident on the diffusion surface at the end closer to the light sources and the amount of light incident on the diffusion surface in the middle portion except for the ends. Thus, this structure can increase the uniformity, in the main scanning direction, of light incident on the diffusion surface of the two light guides as a whole. This structure can therefore further increase the uniformity in the main scanning direction D1 of light that results from the lights having the predetermined wavelength band from the first light source 211 and the third light source 231 and emitted from the two light guides as a whole.

The Y-coordinate of the first light source 211 in the corresponding XY-coordinate system is equal in absolute value to the Y-coordinate of the third light source 231 in the corresponding XY-coordinate system. In other words, the first light source 211 and the third light source 231 are arranged such that the Y-coordinate y1 of the first light source 211 is equal in absolute value to the Y-coordinate y3 of the third light source 231. In this mode, as shown in FIG. 10, one of the first light source 211 and the third light source 231 (the first light source 211 in the present embodiment) can be arranged closer to the emission surface with a predetermined distance to the X-axis of the corresponding light guide while the other light source (the third light source 231 in the present embodiment) can be arranged closer to the diffusion surface with the predetermined distance to the X-axis of the corresponding light guide. Thus, the uneven distribution of light that propagates in the light guide to the emission surface side and the uneven distribution of the light to the diffusion surface side can be made substantially the same. This structure can therefore further increase the uniformity in the main scanning direction D1 of light that results from the lights having the predetermined wavelength band from the first light source 211 and the third light source 231 and emitted from the two light guides as a whole.

In the present embodiment, the X-coordinate and the Y-coordinate of the fifth light source 212 in the corresponding XY-coordinate system are respectively equal to the X-coordinate and Y-coordinate of the sixth light source 232 in the corresponding XY-coordinate system. In other words, the fifth light source 212 and the sixth light source 232 are arranged such that the X-coordinate x5 of the fifth light source 212 is equal to the X-coordinate x6 of the sixth light source 232 and the Y-coordinate y5 of the fifth light source 212 is equal to the Y-coordinate y6 of the sixth light source 232. In this mode, when a substrate same as the first substrate 310 on which the fifth light source 212 and the sixth light source 232 are mounted is used as the second substrate 320 with the sixth light source 232 thereon facing the second end surface 102A of the first light guide 100A, a light source of which the X-coordinate is equal in absolute value to and different in sign from that of the fifth light source 212, i.e., the seventh light source 222, can be arranged at the position facing the second end surface 102A, and a light source of which the X-coordinate is equal in absolute value to and different in sign from that of the sixth light source 232, i.e., the eighth light sources 242, can be arranged at the position facing the fourth end surface 102B. As a result, common substrates can be used as the first substrate 310 and the second substrate 320. Thus, while the number of the types of components of the image sensor lighting unit 1 is reduced, the uniformity of light from the first light guide 100A in the main scanning direction D1 can be increased by applying lights having the predetermined wavelength band from the fifth light source 212 and the seventh light source 222 to the diffusion surface 140A of the first light guide 100A from the positions symmetric about the optical axis 110A of the first light guide 100A. In addition, the uniformity of light from the second light guide 100B in the main scanning direction D1 can be increased by applying lights having the predetermined wavelength band from the sixth light source 232 and the eighth light source 242 to the diffusion surface 140B of the second light guide 100B from the positions symmetric about the optical axis 110B of the second light guide 100B. Here, as described above, the X-coordinates of the fifth light source 212 and the sixth light source 232 may be equal to each other. Meanwhile, the Y-coordinates of the fifth light source 212 and the sixth light source 232 may be equal to each other as in the present embodiment or different from each other, meaning that the positions of the fifth light source 212 and the sixth light source 232 in the Y-axis direction are not limited.

Figure 11:
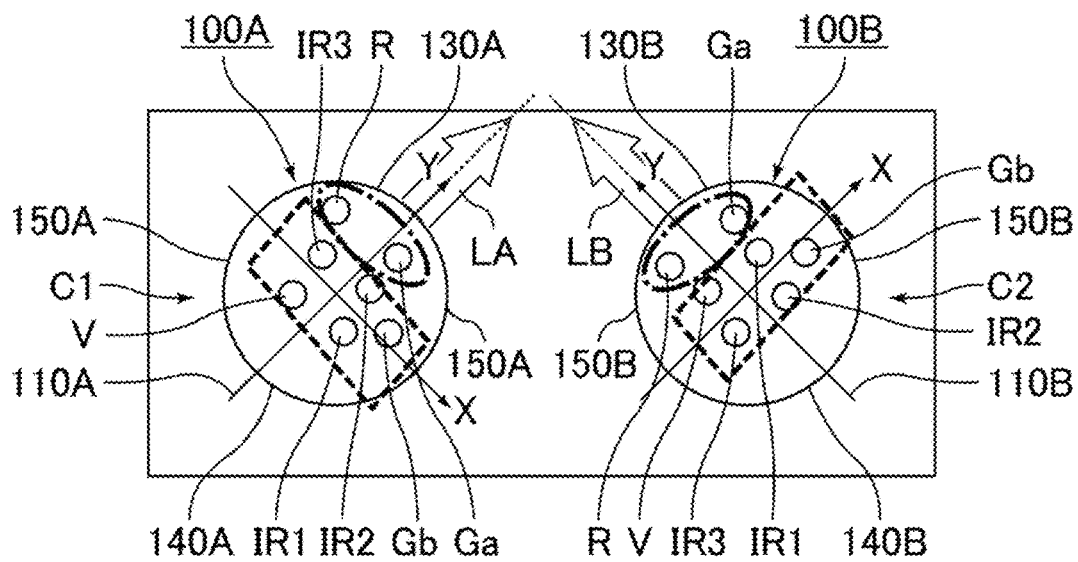
FIG. 11 is a view showing an example of the image sensor lighting unit of Embodiment 2 including light sources in a plurality of wavelength bands, which is also a schematic view of light sources facing a first end surface and light sources facing a third end surface, as viewed from a first substrate side.

FIG. 11 shows an example of the image sensor lighting unit of the present embodiment in which light sources with a plurality of wavelength bands are arranged. The arrangement of the light sources facing the first end surface and the third end surface with the lighting unit viewed from the first substrate side is described.

In FIG. 11, the X-coordinates of the bluish-purple light source V facing the first end surface 101A and the bluish-purple light source V facing the third end surface 101B are equal to each other, and the Y-coordinates thereof are equal in absolute value to and different in sign from each other. The first infrared light sources IR1, the second infrared light sources IR2, the third infrared light sources IR3, and the green light sources Gb face the respective first end surface 101A and third end surface 101B in the same manner. The light sources surrounded by the dashed lines in FIG. 11 (bluish-purple light sources V, first infrared light sources IR1, second infrared light sources IR2, third infrared light sources IR3, and green light sources Gb) are arranged in the same relationship as between the first light source 211 and the third light source 231 shown in FIG. 6.

Also, the X-coordinates of the red light source R facing the first end surface 101A and the red light source R facing the third end surface 101B in FIG. 11 are equal to each other and the Y-coordinates thereof are equal to each other. The green light sources Ga face the respective first end surface 101A and the third end surface 101B in the same manner. In FIG. 11, the light sources surrounded by the dashed and dotted lines (red light sources R and green light sources Ga) are in the same relationship as between the fifth light source 212 and the sixth light source 232 in FIG. 7. In the present embodiment, the two green light sources Ga and Gb of the same type are used to increase the amount of green light.

In the present embodiment, the X-coordinates of the bluish-purple light source V facing the first end surface 101A and the bluish-purple light source V facing the third end surface 101B are equal to each other, and the Y-coordinates thereof are equal in absolute value to and different in sign from each other. Meanwhile, the X-coordinates of the red light source R facing the first end surface 101A and the red light source R facing the third end surface 101B are equal to each other and the Y-coordinates thereof are equal to each other. Here, when the X-coordinates of the red light sources R are equal to each other and the Y-coordinates thereof are equal in absolute value to and different in sign from each other as with the bluish-purple light sources V, the uniformity in the main scanning direction D1 cannot be increased due to the shape of the end surfaces if the absolute values of the Y-coordinates of the red light sources R are large. For this reason, in the present embodiment, the red light sources R are in a different arrangement from the bluish-purple light sources V (specifically, the red light sources R are at the positions where the X-coordinates are equal to each other and the Y-coordinates are equal to each other, especially where the Y-coordinates are positive), so that the uniformity in the main scanning direction D1 is increased. In this manner, in order to increase the uniformity of light from the light guide in the main scanning direction D1, light sources of which the X-coordinates are equal to each other and the Y-coordinates are equal in absolute value to and different in sign from each other may be used together with light sources of which the X-coordinates are equal to each other and the Y-coordinates are equal to each other.

Next, an image sensor of the present embodiment including the image sensor lighting unit 1 is described.

Figure 12:
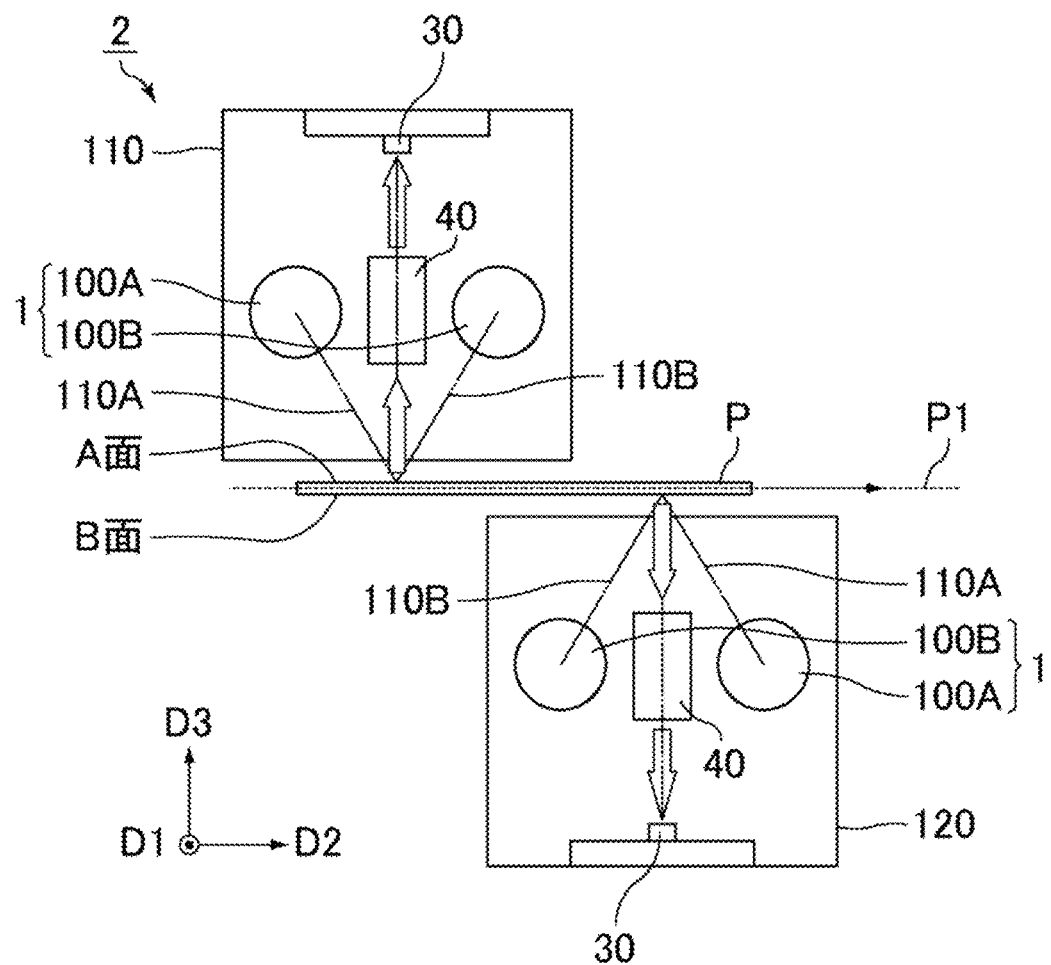
FIG. 12 is a schematic cross-sectional view taken in a sub-scanning direction of an image sensor including the image sensor lighting unit of Embodiment 2.

As shown in FIG. 12, an image sensor 2 is an optical line sensor that acquires the optical image information on a sheet P transported along a transport path P1 in the sub-scanning direction D2, specifically a reflective image. The image sensor 2 includes an upper unit 110 and a lower unit 120 opposite to each other across the transport path P1. The upper unit 110 and the lower unit 120 are respectively positioned above and below the transport path P1. The upper unit 110 acquires a reflective image of a surface A of a sheet P. The lower unit 120 acquires a reflective image of a surface B of a sheet P.

The upper unit 110 and the lower unit 120 each include the image sensor lighting unit 1 including the first light guide 100A and the second light guide 100B, an imaging element 30 such as a CCD image sensor or a CMOS image sensor, and the rod lens array (array of transparent cylindrical condensing lenses) 40 that guides light from a sheet P to the imaging element 30.

Light emitted from each light source (for example, first light source 211, second light source 221, third light source 231, or fourth light source 241) in the image sensor lighting unit 1 and passed through the first light guide 100A and light from each light source and passed through the second light guide 100B are applied to the sheet P. Light resulting from reflection by the sheet P passes through the rod lens array 40 and received by the imaging element 30. In this manner, light from each light source is incident on the first light guide 100A or the second light guide 100B, and the first light guide 100A and the second light guide 100B guide the incident light in the main scanning direction D1 and emit the light in the height direction D3 (the direction perpendicular to the main scanning direction D1 and the sub-scanning direction D2) to apply the light to the sheet P.

The image sensor 2 scans each transported sheet P in the transport direction to capture an image of the entire surface of the sheet P. Specifically, the image sensor 2 captures an image of the entire sheet P by repetitively capturing, at each imaging line, of an image of a linear imaging target region throughout the length of the transported sheet P in the main scanning direction D1.

The image sensor lighting unit 1, including the two light guides 100A and 100B, can increase the intensity of emission light from the image sensor lighting unit 1 and can irradiate a sheet P with lights from two directions, thus reducing or preventing a shadow due to a factor such as a folded line or a wrinkle of the sheet P.

With the two light guides 100A and 100B viewed in the main scanning direction D1, the optical axis 110A of the emission light from the first light guide 100A intersects the optical axis 110B of the emission light from the second light guide 100B. In this mode, with a sheet P placed in a region in which the two optical axes 110A and 110B intersect, the intensity of lights applied to the sheet P can be increased.

Next, a sheet recognition unit of the present embodiment including the image sensor 2 is described. The sheet recognition unit of the present embodiment includes a control unit, a detection unit, and a storage unit.

The control unit includes, for example, programs for executing various processings stored in the storage unit, a central processing unit (CPU) that executes the programs, various hardware devices that are controlled by the CPU, and a logical device such as a field programmable gate array (FPGA). The control unit controls the units of the sheet recognition unit following the programs stored in the storage unit based on signals outputted from the units of the sheet recognition unit and control signals from the control unit. The control unit also functions as a recognition unit owing to the programs stored in the storage unit.

The detection unit includes an image sensor 2 as an image acquisition unit, a magnetic detection unit, and a UV detection unit. The image sensor 2 acquires images of each sheet. The magnetic detection unit includes a magnetic sensor that determines magnetism. The magnetic detection unit uses the magnetic sensor to detect magnetism of a component printed on a sheet, such as a magnetic ink or a security thread. The magnetic sensor is a magnetic line sensor in which magnetic detection elements are arranged in a line. The UV detection unit includes an ultraviolet irradiation unit and a light receiving unit and uses the light receiving unit to detect fluorescence resulting from irradiation of a sheet (for example, banknote) with ultraviolet light from the ultraviolet irradiation unit as well as ultraviolet light transmitted through the sheet (for example, banknote).

The storage unit is defined by a nonvolatile storage device such as a semiconductor memory or a hard disk. The storage unit stores programs and data necessary for the control of the sheet recognition unit.

The recognition unit compares the characteristic pattern of an image of a sheet acquired by the image sensor 2 with the characteristic pattern (for example, templates for denomination recognition) by sheet type (e.g., denomination of a banknote) to determine the type of the sheet (for example, denomination of the banknote).

As described above, in the present embodiment, the X-coordinate of the first light source 211 is equal in absolute value to the X-coordinate of the second light source 221. Thus, lights having the above wavelength band from the first light source 211 and the second light source 221 are applied to the light guide 100A from equal distances relative to the optical axis 110A of the light guide 100A. This structure enables lights to be incident evenly relative to the optical axis 110A as compared to the cases where the lights are applied to the light guide 100A from different distances relative to the optical axis 110A of the light guide 100A. This can increase the uniformity of light from the light guide 100A in the main scanning direction D1 when the first light source 211 and the second light source 221 each are positioned off the center of the corresponding end surface of the light guide 100A.

(Modified Example 1 of Embodiment 2)

The image sensor lighting unit 1 of Embodiment 2 adopts both an arrangement pattern of light sources of which the X-coordinates are equal to each other and the Y-coordinates are equal in absolute value to and different in sign from each other (for example, the arrangement pattern of the first light source 211 and the third light source 231 shown in FIG. 6, which is hereinafter also referred to as the arrangement pattern of FIG. 6), and an arrangement pattern of light sources of which the X-coordinates are equal to each other and the Y-coordinates are equal to each other (for example, the arrangement pattern of the fifth light source 212 and the sixth light source 232 shown in FIG. 7, which is hereinafter also referred to as the arrangement pattern of FIG. 7). The image sensor lighting unit 1 may include the light sources arranged only in the arrangement pattern of FIG. 6. Also, the image sensor lighting unit 1 may include the light sources arranged only in the arrangement pattern of FIG. 7.

(Modified Example 2 of Embodiment 2)

Embodiment 2 uses two light guides (the first light guide 100A and the second light guide 100B). Yet, the image sensor lighting unit 1 may be defined by one light guide 100A or may be defined by three or more light guides. Examples of the cases where three light guides are arranged include an arrangement in which the two light guides 100A and 100B of Embodiment 2 as well as a third light guide as a transmissive light source are arranged, and an arrangement in which the two light guides 100A and 100B of Embodiment 2 each are defined by two light guides.

Embodiment 3

Figure 13:
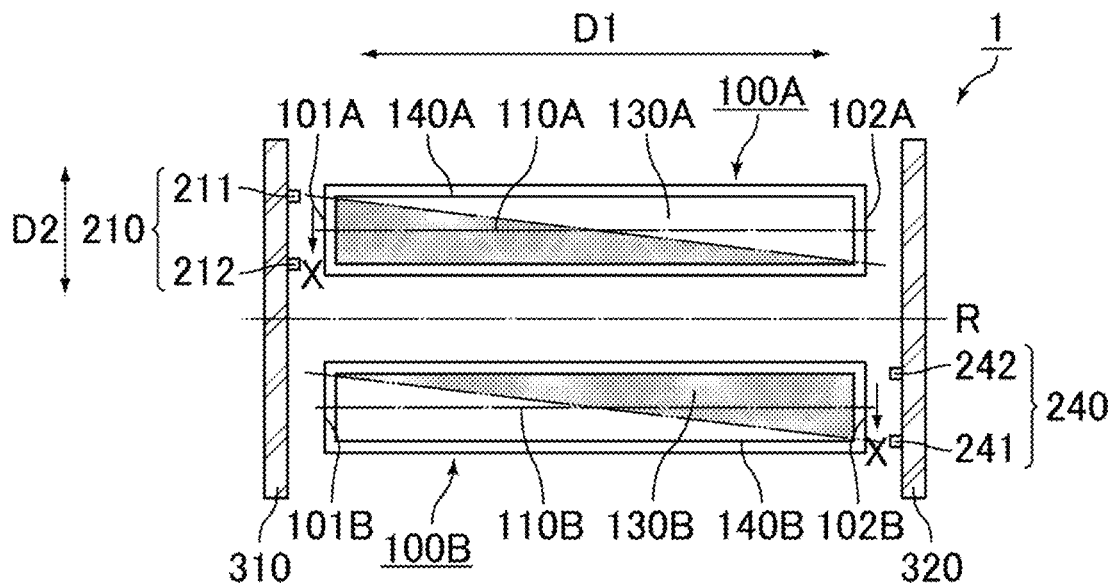
FIG. 13 is a schematic plan view of an image sensor lighting unit of Embodiment 3 as viewed from an emission surface side of a light guide.

In the present embodiment, features unique to the present embodiment are mainly described and detailed description of the same components as in the embodiments above is omitted. In the image sensor lighting unit 1 of Embodiment 2, the first light source group 210, the second light source group 220, the third light source group 230, and the fourth light source group 240 respectively face the first end surface 101A, the second end surface 102A, the third end surface 101B, and the fourth end surface 102B. In the present embodiment, as shown in FIG. 13, the first light source group 210 faces the first end surface 101A, the fourth light source group 240 faces the fourth end surface 102B, and no light source group is placed at the positions facing the second end surface 102A and the third end surface 101B.

In the present embodiment, the X-coordinate of the first light source 211 in the corresponding XY-coordinate system is equal in absolute value to and different in sign from the X-coordinate of the fourth light source 241 in the corresponding XY-coordinate system. In other words, the first light source 211 and the fourth light source 241 are arranged such that the X-coordinate x1 of the first light source 211 is equal in absolute value to the X-coordinate x4 of the fourth light source 241 and the X-coordinate x1 of the first light source 211 is different in sign from the X-coordinate x4 of the fourth light source 241. Thus, lights having the above wavelength band from the first light source 211 and the fourth light source 241 are applied to the corresponding light guide from equal distances relative to the linear imaging target region R of a sheet P. This structure enables lights to be incident evenly relative to the imaging target region R as compared to the cases where the lights are applied to the corresponding light guide from different distances relative to the imaging target region R. This structure can therefore increase the uniformity in the main scanning direction D1 of light that results from the lights from the light guide 100A and the light guide 100B and emitted from the image sensor lighting device 1 as a whole even when the first light source 211 and the fourth light source 241 are respectively off the center of the corresponding end surface of the light guide 100A and the center of the corresponding end surface of the light guide 100B. Also, in this mode, the same substrate as the first substrate 310 can be used as the second substrate 320, so that the number of types of components defining the image sensor lighting unit 1 can be reduced.

Also, the X-coordinate of the fifth light source 212 in the corresponding XY-coordinate system is equal in absolute value to and different in sign from the X-coordinate of the eighth light source 242 in the corresponding XY-coordinate system. In other words, the fifth light source 212 and the eighth light source 242 are arranged such that the X-coordinate x5 of the fifth light source 212 is equal in absolute value to the X-coordinate x8 of the eighth light source 242 and the X-coordinate x5 of the fifth light source 212 is different in sign from the X-coordinate x8 of the eighth light source 242. This structure, with the fifth light source 212 and the eighth light source 242 arranged in the same relationship as between the first light source 211 and the fourth light source 241, can achieve the same effect as the arrangement of the first light source 211 and the fourth light source 241. The structure therefore can increase the uniformity in the main scanning direction D1 of light that results from the lights from the light guide 100A and the light guide 100B and emitted from the image sensor lighting unit 1 as a whole. Also, in this mode, the same substrate as the first substrate 310 can be used as the second substrate 320, so that the number of types of components defining the image sensor lighting unit 1 can be reduced.

The Y-coordinate of the first light source 211 in the corresponding XY-coordinate system is equal to the Y-coordinate of the fourth light source 241 in the corresponding XY-coordinate system. In other words, the first light source 211 and the fourth light source 241 are arranged such that the Y-coordinate y1 of the first light source 211 is equal to the Y-coordinate y4 of the fourth light source 241. In this mode, the same substrate as the first substrate 310 can be used as the second substrate 320, so that the number of types of components defining the image sensor lighting unit 1 can be reduced. Also, in this mode, the first light source 211 and the fourth light source 241 can be at equal distances from the X-axis set on the end surface of the corresponding light guide. This structure can therefore further increase the uniformity in the main scanning direction D1 of light that results from the lights having the predetermined wavelength band from the first light source 211 and the fourth light source 241 and emitted from the two light guides as a whole.

The Y-coordinate of the fifth light source 212 in the corresponding XY-coordinate system is equal to the Y-coordinate of the eighth light source 242 in the corresponding XY-coordinate system. In other words, the fifth light source 212 and the eighth light source 242 are arranged such that the Y-coordinate y5 of the fifth light source 212 is equal to the Y-coordinate y8 of the eighth light source 242. In this mode, the same substrate as the first substrate 310 can be used as the second substrate 320, so that the number of types of components defining the image sensor lighting unit 1 can be reduced.

Embodiment 4

Figure 14:
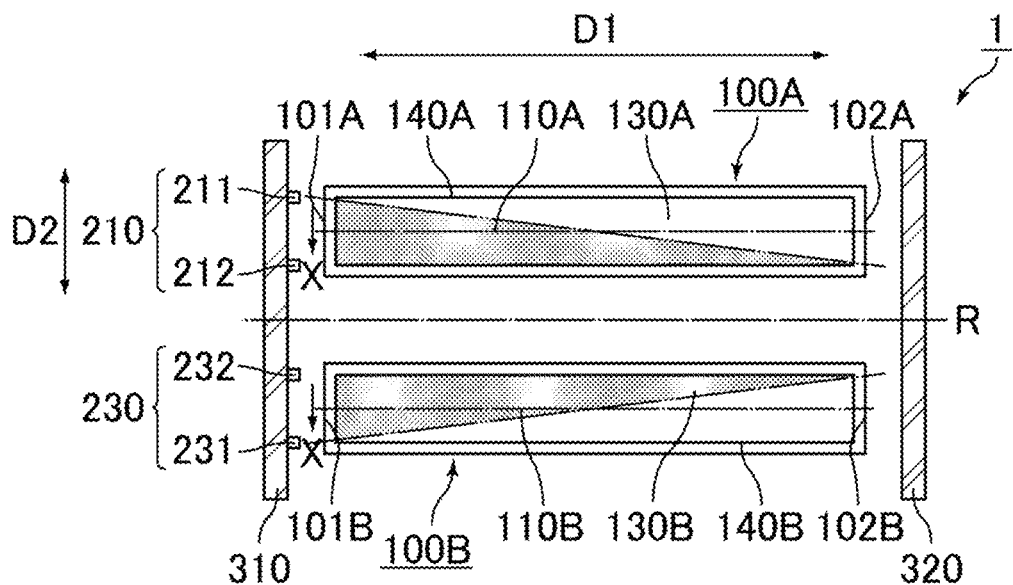
FIG. 14 is a schematic plan view of an image sensor lighting unit of Embodiment 4 as viewed from an emission surface side of a light guide.

In the present embodiment, features unique to the present embodiment are mainly described and detailed description of the same components as in the embodiments above is omitted. In the image sensor lighting unit 1 of Embodiment 2, the first light source group 210, the second light source group 220, the third light source group 230, and the fourth light source group 240 respectively face the first end surface 101A, the second end surface 102A, the third end surface 101B, and the fourth end surface 102B. In the present embodiment, as shown in FIG. 14, the first light source group 210 faces the first end surface 101A, the third light source group 230 faces the third end surface 101B, and no light source group is placed at the positions facing the second end surface 102A and the fourth end surface 102B.

In the present embodiment, the X-coordinate of the first light source 211 in the corresponding XY-coordinate system is equal in absolute value to and different in sign from the X-coordinate of the third light source 231 in the corresponding XY-coordinate system. In other words, the first light source 211 and the third light source 231 are arranged such that the X-coordinate x1 of the first light source 211 is equal in absolute value to the X-coordinate x3 of the third light source 231 and the X-coordinate x1 of the first light source 211 is different in sign from the X-coordinate x3 of the third light source 231. Thus, lights having the above wavelength band from the first light source 211 and the third light source 231 are applied to the corresponding light guide from equal distances relative to the linear imaging target region R of a sheet P. This structure enables lights to be incident evenly relative to the imaging target region R as compared to the cases where the lights are applied to the corresponding light guide from different distances relative to the imaging target region R. This structure can therefore increase the uniformity in the main scanning direction D1 of light that results from the lights from the light guides 100A and 100B and emitted from the image sensor lighting device 1 as a whole when the first light source 211 and the third light source 231 each are positioned off the center of the corresponding end surface of the light guide 100A.

Also, the X-coordinate of the fifth light source 212 in the corresponding XY-coordinate system is equal in absolute value to and different in sign from the X-coordinate of the sixth light source 232 in the corresponding XY coordinate system. In other words, the fifth light source 212 and the sixth light source 232 are arranged such that the X-coordinate x5 of the fifth light source 212 is equal in absolute value to the X-coordinate x6 of the sixth light source 232 and the X-coordinate x5 of the fifth light source 212 is different in sign from the X-coordinate x6 of the sixth light source 232. This structure, with the fifth light source 212 and the sixth light source 232 arranged in the same relationship as between the first light source 211 and the third light source 231, can achieve the same effect as the arrangement of the first light source 211 and the third light source 231. This structure can therefore increase the uniformity in the main scanning direction D1 of light that results from the lights from the light guides 100A and 100B and emitted from the image sensor lighting device 1 as a whole.

The Y-coordinate of the first light source 211 in the corresponding XY-coordinate system is equal in absolute value to and different in sign from the Y-coordinate of the third light source 231 in the corresponding XY-coordinate system. In other words, the first light source 211 and the third light source 231 are arranged such that the Y-coordinate y1 of the first light source 211 is equal in absolute value to the Y-coordinate y3 of the third light source 231 and the Y-coordinate y1 of the first light source 211 is different in sign from the Y-coordinate y3 of the third light source 231. This can achieve the same effect as in Embodiment 2.

Also, the Y-coordinate of the fifth light source 212 in the corresponding XY-coordinate system is equal in absolute value to and different in sign from the Y-coordinate of the sixth light source 232 in the corresponding XY-coordinate system. In other words, the fifth light source 212 and the sixth light source 232 are arranged such that the Y-coordinate y5 of the fifth light source 212 is equal in absolute value to the Y-coordinate y6 of the sixth light source 232 and the Y-coordinate y5 of the fifth light source 212 is different in sign from the Y-coordinate y6 of the sixth light source 232. This can achieve the same effect as in Embodiment 2.

The present disclosure is described in more detail based on the following examples. The present disclosure is not limited to the examples.

EXAMPLE 1

Figure 15:
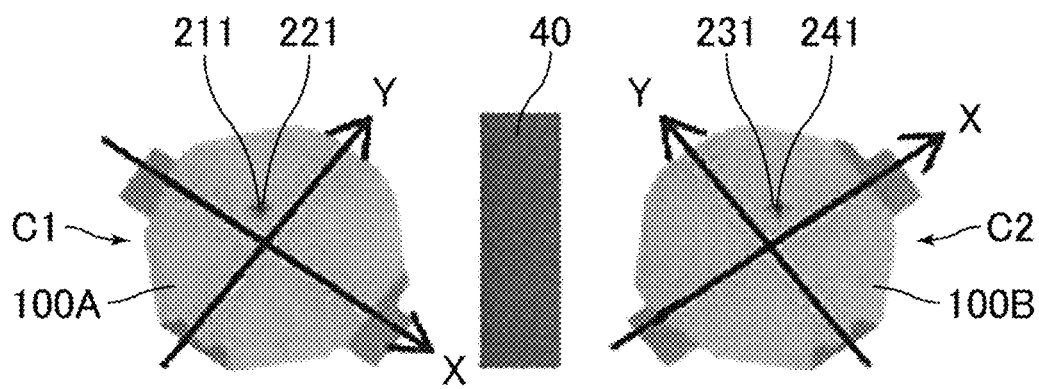
FIG. 15 is a transparent schematic view of an arrangement of light sources with an image sensor lighting unit of Example 1 viewed from a first substrate side.
Figure 16:
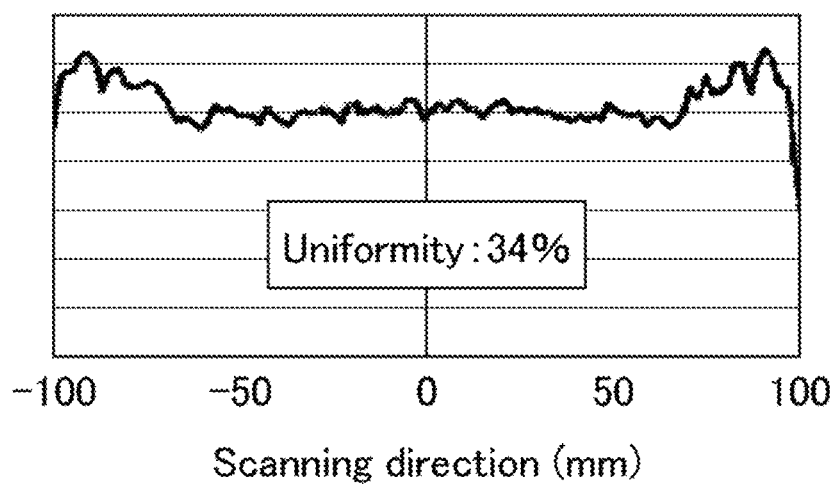
FIG. 16 is a simulation result of the uniformity of emission light in a main scanning direction in the image sensor lighting unit of Example 1.

In Example 1, the image sensor lighting unit 1 having the structure shown in FIG. 15 was used to simulate the uniformity of emission light in the main scanning direction. The first light source 211 faced the first end surface of the light guide 100A. The second light source 221 faced the second end surface of the light guide 100A. The third light source 231 faced the third end surface of the light guide 100B. The fourth light source 241 faced the fourth end surface of the light guide 100B. In Example 1, as shown in FIG. 15, the X-coordinates of the first light source 211 and the second light source 221 were set negative. The X-coordinates of the third light source 231 and the fourth light source 241 were set positive. The X-coordinates of the first light source 211, the second light source 221, the third light source 231, and the fourth light source 241 were equal in absolute value to one another. The Y-coordinates of the first light source 211, the second light source 221, the third light source 231, and the fourth light source 241 were set positive and equal in absolute value to one another. FIG. 16 shows that the uniformity of emission light in the main scanning direction in the image sensor lighting unit of Example 1 was 34%.

EXAMPLE 2

Figure 17:
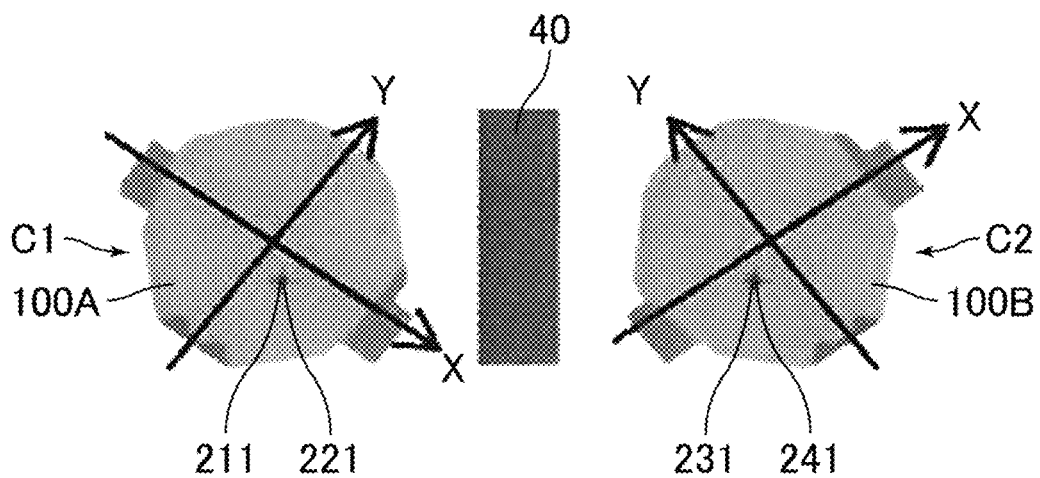
FIG. 17 is a transparent schematic view of an arrangement of light sources with an image sensor lighting unit of Example 2 viewed from a first substrate.
Figure 18:
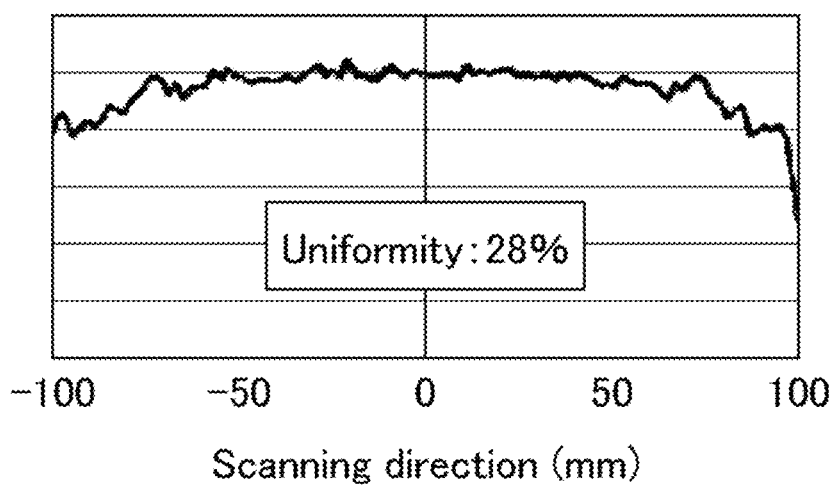
FIG. 18 is a simulation result of the uniformity of emission light in a main scanning direction in the image sensor lighting unit of Example 2.

In Example 2, the image sensor lighting unit 1 having the structure shown in FIG. 17 was used to simulate the uniformity of emission light in the main scanning direction. The first light source 211 faced the first end surface of the light guide 100A. The second light source 221 faced the second end surface of the light guide 100A. The third light source 231 faced the third end surface of the light guide 100B. The fourth light source 241 faced the fourth end surface of the light guide 100B. In Example 2, as shown in FIG. 17, the X-coordinates of the first light source 211 and the second light source 221 were set positive. The X-coordinates of the third light source 231 and the fourth light source 241 were set negative. The X-coordinates of the first light source 211, the second light source 221, the third light source 231, and the fourth light source 241 were set equal in absolute value to one another. The Y-coordinates of the first light source 211, the second light source 221, the third light source 231, and the fourth light source 241 were set negative and equal in absolute value to one another. FIG. 18 shows that the uniformity of emission light in the main scanning direction in the image sensor lighting unit of Example 2 was 28%.

EXAMPLE 3

Figure 19:
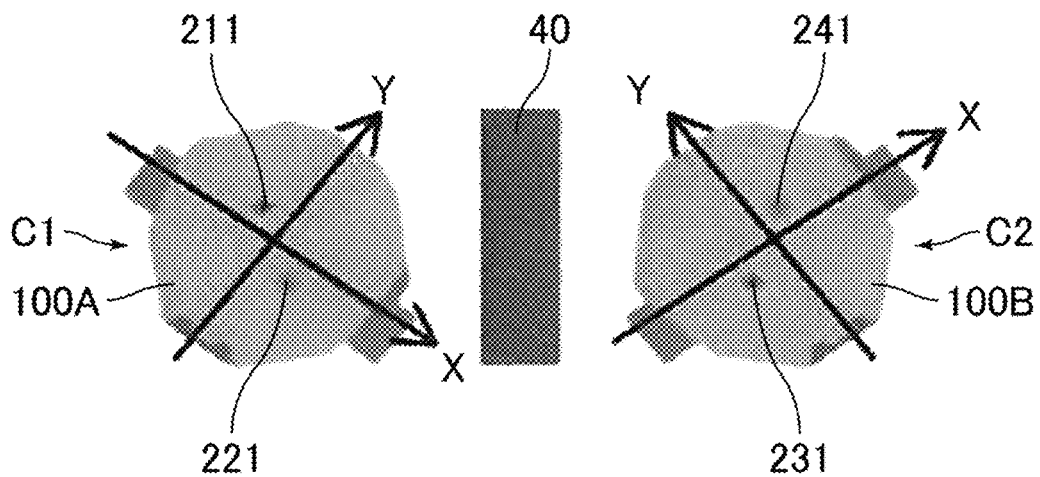
FIG. 19 is a transparent schematic view of an arrangement of light sources with an image sensor lighting unit of Example 3 viewed from a first substrate side.
Figure 20:
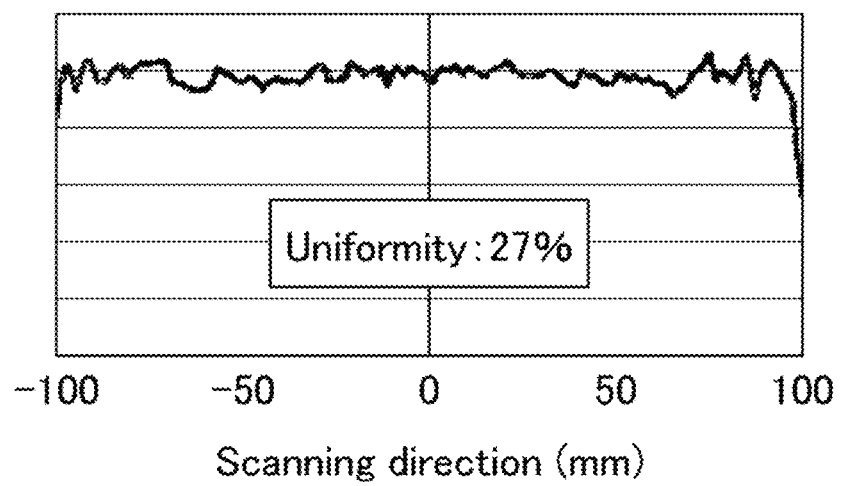
FIG. 20 is a simulation result of the uniformity of emission light in a main scanning direction in the image sensor lighting unit of Example 3.

In Example 3, the image sensor lighting unit 1 having the structure shown in FIG. 19 was used to simulate the uniformity of emission light in the main scanning direction. The first light source 211 faced the first end surface of the light guide 100A. The second light source 221 faced the second end surface of the light guide 100A. The third light source 231 faced the third end surface of the light guide 100B. The fourth light source 241 faced the fourth end surface of the light guide 100B. In Example 3, as shown in FIG. 19, the X-coordinates of the first light source 211 and the third light source 231 were set negative. The X-coordinates of the second light source 221 and the fourth light source 241 were set positive. The X-coordinates of the first light source 211, the second light source 221, the third light source 231, and the fourth light source 241 were set equal in absolute value to one another. The Y-coordinates of the first light source 211 and the fourth light source 241 were set positive. The Y-coordinates of the second light source 221 and the third light source 231 were set negative. The Y-coordinates of the first light source 211, the second light source 221, the third light source 231, and the fourth light source 241 were set equal in absolute value to one another. FIG. 20 shows that the uniformity of emission light in the main scanning direction in the image sensor lighting unit of Example 3 was 27%.

(Consideration of Examples 1 to 3)

Examples 1 to 3 demonstrated that the uniformity of emission light from each of the light guides 100A and 100B in the main scanning direction of the image sensor lighting unit can be increased when the X-coordinate of the first light source 211 in the corresponding XY-coordinate system is made equal in absolute value to the X-coordinate of the second light source 221 in the corresponding XY-coordinate system and the X-coordinate of the third light source 231 in the corresponding XY-coordinate system is made equal in absolute value to the X-coordinate of the fourth light source 241 in the corresponding XY-coordinate system.

In particular, Example 3 demonstrated that, as compared with Examples 1 and 2, the uniformity of emission light from each of the light guides 100A and 100B in the main scanning direction of the image sensor lighting unit can be further increased. Also, in Example 3, unlike Examples 1 and 2, the X-coordinate of the first light source 211 in the corresponding XY-coordinate system is different in sign from the X-coordinate of the second light source 221 in the corresponding XY-coordinate system, the X-coordinate of the third light source 231 in the corresponding XY-coordinate system is equal to the X-coordinate of the first light source 211 in the XY-coordinate system, the Y-coordinate of the first light source 211 in the corresponding XY-coordinate system is different in sign from the Y-coordinate of the third light source 231 in the corresponding XY-coordinate system, the Y-coordinate of the first light source 211 in the corresponding XY-coordinate system is equal in absolute value to the Y-coordinate of the third light source 231 in the corresponding XY-coordinate system, the first light source 211 and the second light source 231 are symmetric about the origin of the XY-coordinate system C1, and the third light source 231 and the fourth light source 241 are symmetric about the origin of the XY-coordinate system C2. Each of these structures or two or more of these structures in combination is/are therefore considered to have contributed to a further increase in uniformity of emission light.

The embodiments of the present disclosure were described with reference to the drawings. The present disclosure is not limited to these embodiments. Each and every matter described above is applicable to all the aspects of the present disclosure. The structures of the embodiments may be combined or modified as appropriate within the spirit of the present disclosure.

INDUSTRIAL APPLICABILITY

As described above, the present invention provides a technique useful in acquisition of optical image information by an image sensor.

What is claimed is:

1. An image sensor lighting unit comprising:
at least one light guide extending in a main scanning direction and configured to emit light in a predetermined direction;
a first light source group facing a first end surface of at least two end surfaces of the at least one light guide in the main scanning direction; and
a second light source group facing a second end surface of the at least two end surfaces,
the first light source group including a first light source configured to emit light having a predetermined wavelength band,
the second light source group including a second light source configured to emit light having a same wavelength band as the light emitted from the first light source,
with an XY-coordinate system consisting of a Y-axis and an X-axis set with the at least one light guide viewed from the first end surface side in the main scanning direction, an X-coordinate of the first light source in a corresponding XY-coordinate system being equal in absolute value to an X-coordinate of the second light source in a corresponding XY-coordinate system,
the Y-axis set on an optical axis of emitted light and being positive in a traveling direction of the emitted light, and
the X-axis formed by rotating the Y-axis clockwise by 90° with a center of an end surface of the corresponding light guide in the main scanning direction taken as an axis of rotation.

2. The image sensor lighting unit according to claim 1, wherein the at least one light guide comprises two or more light guides.

3. The image sensor lighting unit according to claim 2, wherein the first end surface and the second end surface are respectively positioned at one end and the other end of a first light guide of the two or more light guides in the main scanning direction, and
the X-coordinate of the first light source in the corresponding XY-coordinate system is different in sign from the X-coordinate of the second light source in the corresponding XY-coordinate system.

4. The image sensor lighting unit according to claim 3, wherein the lighting unit further includes a third light source group facing a third end surface of a second light guide of the two or more light guides, the third end surface being one of two end surfaces of the second light guide in the main scanning direction, whichever closer to the first end surface of the first light guide,
the third light source group includes a third light source configured to emit light having a same wavelength band as the light from the first light source, and
an X-coordinate of the third light source in a corresponding XY-coordinate system is equal to the X-coordinate of the first light source in the corresponding XY-coordinate system.

5. The image sensor lighting unit according to claim 4, wherein a Y-coordinate of the first light source in the corresponding XY-coordinate system is different in sign from a Y-coordinate of the third light source in the corresponding XY-coordinate system.

6. The image sensor lighting unit according to claim 4, wherein a Y-coordinate of the first light source in the corresponding XY-coordinate system is equal in absolute value to a Y-coordinate of the third light source in the corresponding XY-coordinate system.

7. The image sensor lighting unit according to claim 4, wherein the first light source group further includes a fourth light source configured to emit light having a predetermined wavelength band,
the third light source group further includes a fifth light source configured to emit light having a same wavelength band as the light from the fourth light source, and
an X-coordinate and a Y-coordinate of the fourth light source in a corresponding XY-coordinate system are respectively equal to an X-coordinate and a Y-coordinate of the fifth light source in a corresponding XY-coordinate system.

8. The image sensor lighting unit according to claim 4, wherein a Y-coordinate of the first light source in the corresponding XY-coordinate system is equal to a Y-coordinate of the third light source in the corresponding XY-coordinate system.

9. The image sensor lighting unit according to claim 4, wherein the lighting unit further comprises:
a fourth light source group facing a fourth end surface of the second light guide, the fourth end surface being one of two end surfaces of the second light guide in the main scanning direction, whichever farther from the first end surface of the first light guide;
a first substrate on which the first light source group and the third light source group are mounted; and
a second substrate on which the second light source group and the fourth light source group are mounted.

10. The image sensor lighting unit according to claim 2, wherein an optical axis of light emitted from a first light guide of the two or more light guides intersects an optical axis of light emitted from a second light guide of the two or more light guides.

* * * * *